(12) United States Patent
Carver et al.

(10) Patent No.: US 9,702,483 B2
(45) Date of Patent: Jul. 11, 2017

(54) SANITARY APPARATUS

(75) Inventors: Malcolm James Carver, Pymble (AU); Steve Ronald Paul, Brisbane (AU); Luke Ralph de Gioia, Woronora Heights (AU)

(73) Assignee: UUBEE PTY LTD, Queensland (AU)

( * ) Notice: Subject to any disclaimer, the term of this patent is extended or adjusted under 35 U.S.C. 154(b) by 203 days.

(21) Appl. No.: 14/240,864

(22) PCT Filed: Aug. 24, 2012

(86) PCT No.: PCT/AU2012/000995
§ 371 (c)(1),
(2), (4) Date: Apr. 7, 2014

(87) PCT Pub. No.: WO2013/026101
PCT Pub. Date: Feb. 28, 2013

(65) Prior Publication Data
US 2014/0245531 A1 Sep. 4, 2014

(30) Foreign Application Priority Data
Aug. 25, 2011 (AU) ................................. 2011903420

(51) Int. Cl.
*E03D 11/02* (2006.01)
*F16L 3/10* (2006.01)
(Continued)

(52) U.S. Cl.
CPC .............. *F16L 3/1075* (2013.01); *E03C 1/01* (2013.01); *E03C 1/324* (2013.01); *E03D 1/003* (2013.01);
(Continued)

(58) Field of Classification Search
CPC ....... E03D 11/12; F16L 27/02; F16L 27/0804; F16L 27/0845; F16L 3/1075
USPC ............. 239/587.2; 285/127.1, 145.2, 145.4, 285/147.1, 181, 184, 302, 57; 4/252.3, 4/312, 638, 664, 670
See application file for complete search history.

(56) References Cited

U.S. PATENT DOCUMENTS

| 381,008 | A | * | 4/1888 | Gould | ..................... F16L 27/12 104/52 |
| 1,097,569 | A | * | 5/1914 | Sweeney | ................. E03D 11/12 4/312 |

(Continued)

FOREIGN PATENT DOCUMENTS

| CN | 201437872 U | 4/2010 |
| JP | 2001-200968 A | 7/2001 |
| NL | 7801531 A | 8/1979 |

OTHER PUBLICATIONS

International Search Report and Written Opinion of PCT/AU2012/000995 mailed on Oct. 25, 2012, 10 pages.

*Primary Examiner* — Allana Lewin Bidder
*Assistant Examiner* — Nicholas Ros
(74) *Attorney, Agent, or Firm* — Kilpatrick Townsend & Stockton LLP

(57) ABSTRACT

An apparatus including at least one concealable sanitary fixture, such as a toilet bowl (2), moveable between a concealed position and an extended/exposed position. A hinged conduit (4) provides a fluid tight connection between the toilet bowl (2) and a waste outlet (5). Hinges (6, 7) allow the conduit (4) to adjust with the movement of the toilet bowl (2).

8 Claims, 27 Drawing Sheets

(51) Int. Cl.
*E03D 11/12* (2006.01)
*E03C 1/01* (2006.01)
*E03D 1/00* (2006.01)
*E03C 1/324* (2006.01)
*F16L 27/08* (2006.01)

(52) U.S. Cl.
CPC .......... *E03D 11/12* (2013.01); *F16L 27/0845* (2013.01); *E03C 2201/90* (2013.01)

(56) References Cited

U.S. PATENT DOCUMENTS

| | | | |
|---|---|---|---|
| 2,552,546 A * | 5/1951 | Fergusson | E03C 1/01 4/312 |
| 2,611,134 A * | 9/1952 | Jarrett | E03C 1/01 4/300 |
| 3,614,791 A | 10/1971 | Newburger | |
| 3,829,906 A | 8/1974 | McPhee | |
| 4,366,584 A * | 1/1983 | Mchuma | E03C 1/01 4/307 |
| 4,653,128 A * | 3/1987 | Canalizo | E03C 1/01 4/663 |
| 4,680,817 A * | 7/1987 | Sloan | E03C 1/01 4/312 |
| 4,970,732 A | 11/1990 | Deng | |
| 5,765,237 A * | 6/1998 | Okamoto | E03D 11/12 4/300 |
| 5,813,047 A * | 9/1998 | Teichroeb | E03D 1/003 4/364 |
| 6,637,049 B2 * | 10/2003 | Gallant | A61G 7/00 312/249.7 |
| 6,986,171 B1 * | 1/2006 | Perrin | E03D 11/12 4/300.2 |
| 8,070,076 B2 * | 12/2011 | Erickson | E03C 1/0404 239/279 |

* cited by examiner

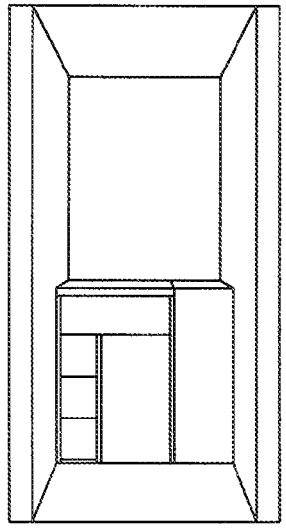 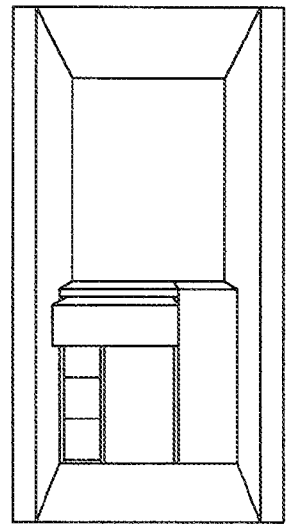 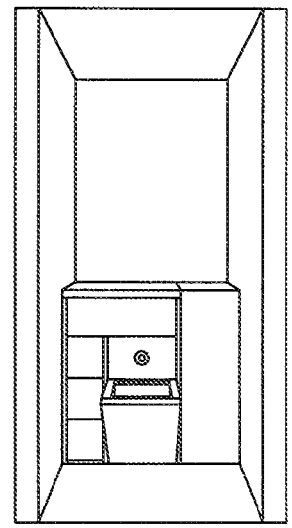
FIG. 14A  FIG. 14B  FIG. 14C
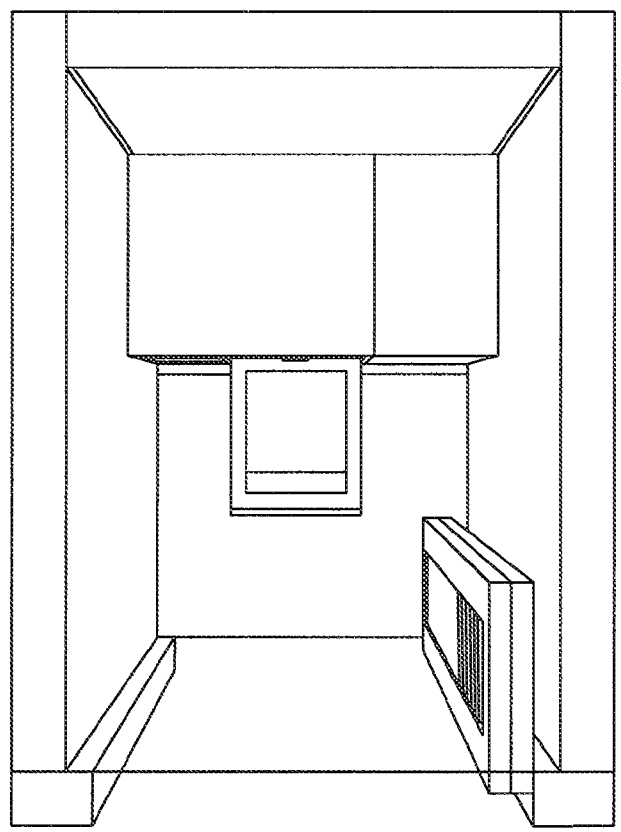
FIG. 14D

SANITARY APPARATUS

FIELD OF THE INVENTION

The present invention relates to an apparatus for sanitary purposes, in particular, an apparatus including at least one concealable sanitary fixture.

DESCRIPTION OF THE BACKGROUND ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Bathroom environments include a variety of sanitary fixtures such as sinks and toilets. Due to their functional requirements, sanitary fixtures are often oddly shaped, bulky, and unattractive. For this reason bathroom environments can often feel cluttered, cramped and visually intrusive. Moreover, sanitary fixtures are often dirty and can emit distasteful odours. These negative aspects can lead to feelings of discomfort for users of kitchens and bathrooms.

It can be particularly difficult to design an ergonomic bathroom with all the necessary fixtures in a confined space, such as on an aeroplane for example.

The present invention seeks to address one or more disadvantages of existing sanitary fixture arrangements.

SUMMARY OF THE INVENTION

In one broad from the present invention provides an apparatus having a first concealable sanitary fixture.

In one preferred from the first concealable sanitary fixture is movable between a concealed position and an exposed position.

In a further preferred form, the apparatus includes a waste outlet in fluid connection with the first concealable sanitary fixture.

Preferably, a water seal is maintainable between the waste outlet and the sanitary fixture when the concealable sanitary fixture is in the concealed position or the exposed position.

Also preferably, the water seal is at least 75mm.

In a further preferred form, the first concealable sanitary fixture is accessible for use when in the exposed position.

Preferably, the first concealable sanitary fixture includes an inlet.

Also preferably, the apparatus further includes a second concealable sanitary fixture.

In a further preferred form the second concealable sanitary fixture includes an outlet in fluid connection with the inlet of the first concealable sanitary fixture.

Also preferably, the apparatus includes a concealed cistern or reservoir in fluid connection with the inlet of the first concealable sanitary fixture.

Also preferably, the first and/or second concealable sanitary fixture includes an integral overflow.

In a further preferred form, a hinged conduit is included between the first sanitary fixture and the waste outlet.

In one preferred form the hinged conduit includes at least two hinged portions that permit the first concealable sanitary fixture to be moved between the concealed position and the exposed position whilst maintaining the fluid tight connection between the first concealable sanitary fixture and the waste outlet.

In a further preferred form, the first concealable sanitary fixture is a toilet bowl.

In a further preferred form, the second concealable sanitary fixture is a basin.

Preferably, the, apparatus includes a tray positioned below the basin to capture waste water from the basin.

In a further preferred form, the apparatus is free standing.

In a further preferred form the apparatus is positionable within a wall or structure such that when the first concealable sanitary fixture is in the concealed position the apparatus sits flush with the wall or structure Preferably, the apparatus is formed as part of a piece of furniture.

Also preferably, the apparatus is formed as part of a cabinet.

In a further preferred form, the apparatus further includes at least a storage space.

In a further broad from the present invention provides a hinged conduit for transferring a fluid including:
  an inlet;
  an outlet in fluid tight connection with the inlet; and
  at least two hinges between the inlet and the outlet,
  wherein the at least two hinges permit the inlet to be moved relative to the outlet whilst maintaining the fluid tight connection between the inlet and the outlet.

Preferably, the hinged conduit includes:
  an inlet member;
  an outlet member; and
  a connecting member,
  wherein the inlet member is hingedly engaged to a first end of the connecting member and the outlet member is hingedly engaged to a second end of the connecting member, and
  wherein that the inlet and outlet members are permitted to rotate with respect to the connecting member such that the internal dimensions of the conduit are maintained.

Preferably, the connecting member is extendable.

In a further preferred form, the connecting member is telescopic.

In a further broad form, the present invention provides a plumbing trap including a hinged conduit as described above.

In a further broad form, the present invention provides a bed including at least one concealable sanitary fixture.

In one preferred form, the at least one concealable sanitary fixture is a basin and/or a toilet bowel.

In a further preferred form, the bed includes an apparatus as described herein.

In a further broad form, the present invention provides a cabin for use in an aircraft, boat, train or the like, the cabin including at least one concealable sanitary fixture.

In a further preferred form, the at least one sanitary fixture is basin and/or a toilet bowl. In one preferred form, the cabin includes an apparatus as described herein.

BRIEF DESCRIPTION OF THE DRAWINGS

An example of the present invention will now be described with reference to the accompanying drawings, in which:

FIGS. 14(a) to (d) show views of an example powder room that implements the sanitary apparatus, in particular, (a) shows a front perspective view with toilet bowl and basin concealed, (b) shows a front perspective view with basin exposed, (c) shows a front perspective view with toilet bowl exposed and (d) shows a top perspective view with toilet bowl exposed;

FIGS. 19(a) to (d) show views of an example of a toilet cubicle implementing the apparatus of FIG. 1, in particular, (a) shows a front perspective view with toilet bowl and basin concealed, (b) shows a top perspective view with toilet bowl exposed, and (c) shows a top perspective view with toilet bowl exposed;

DETAILED DESCRIPTION OF A PREFERRED EMBODIMENT

Figure 1:
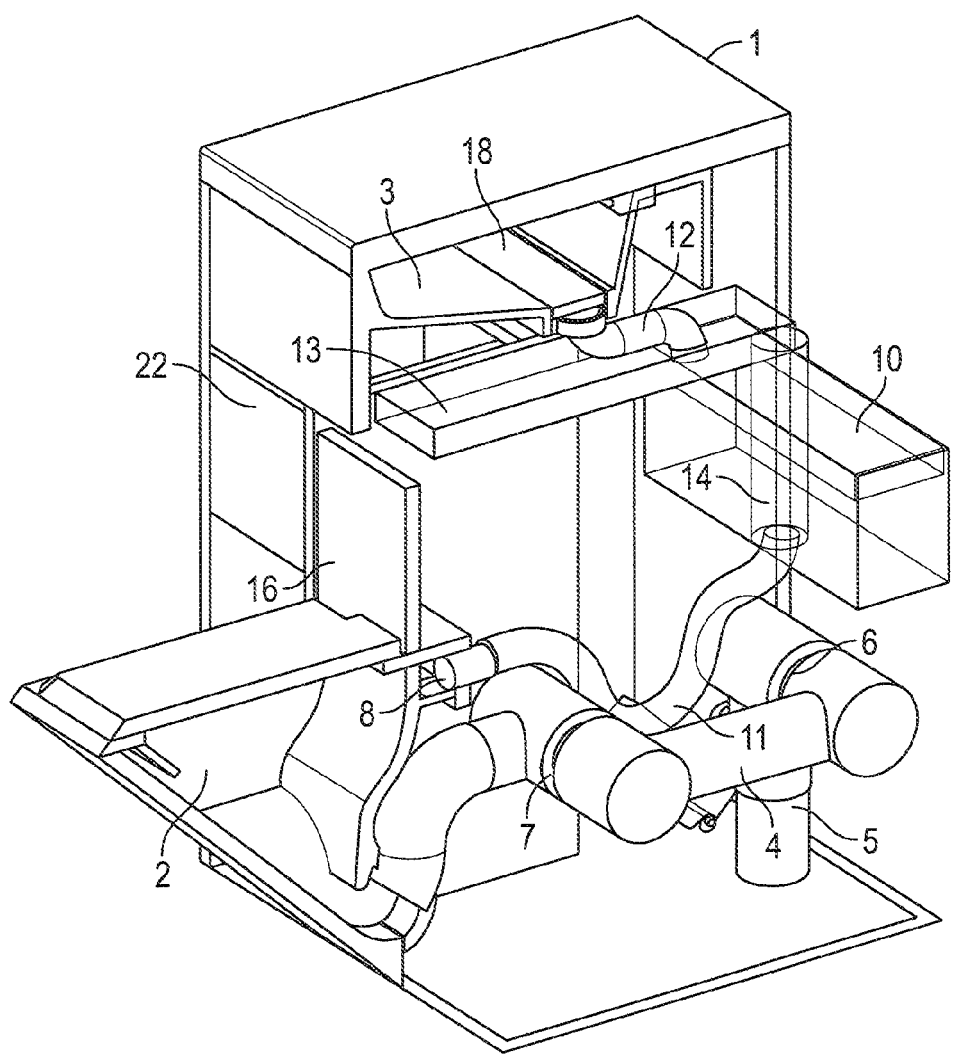
FIG. 1 is sectional perspective view of an example of the sanitary apparatus having a toilet bowl in the extended position.
Figure 2:
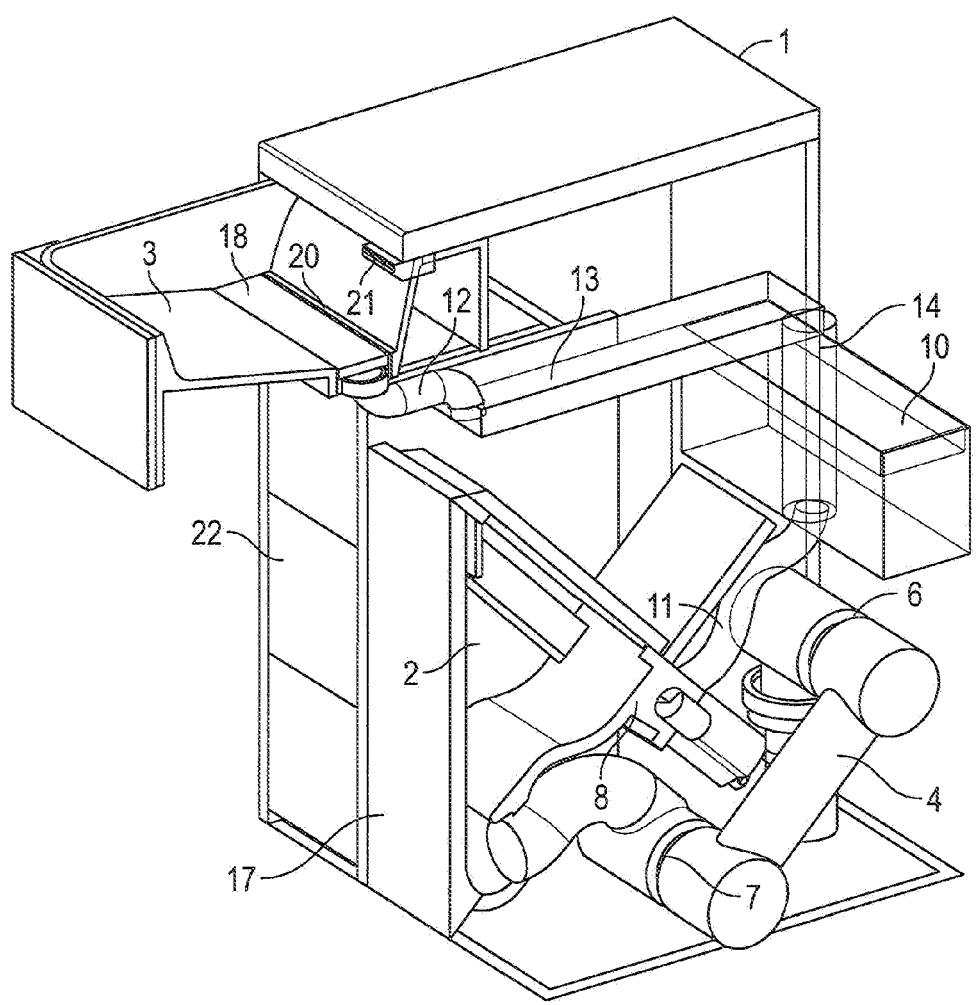
FIG. 2 is sectional perspective view of the apparatus having the basin in the extended position and the toilet bowl in the concealed position.
Figure 3:
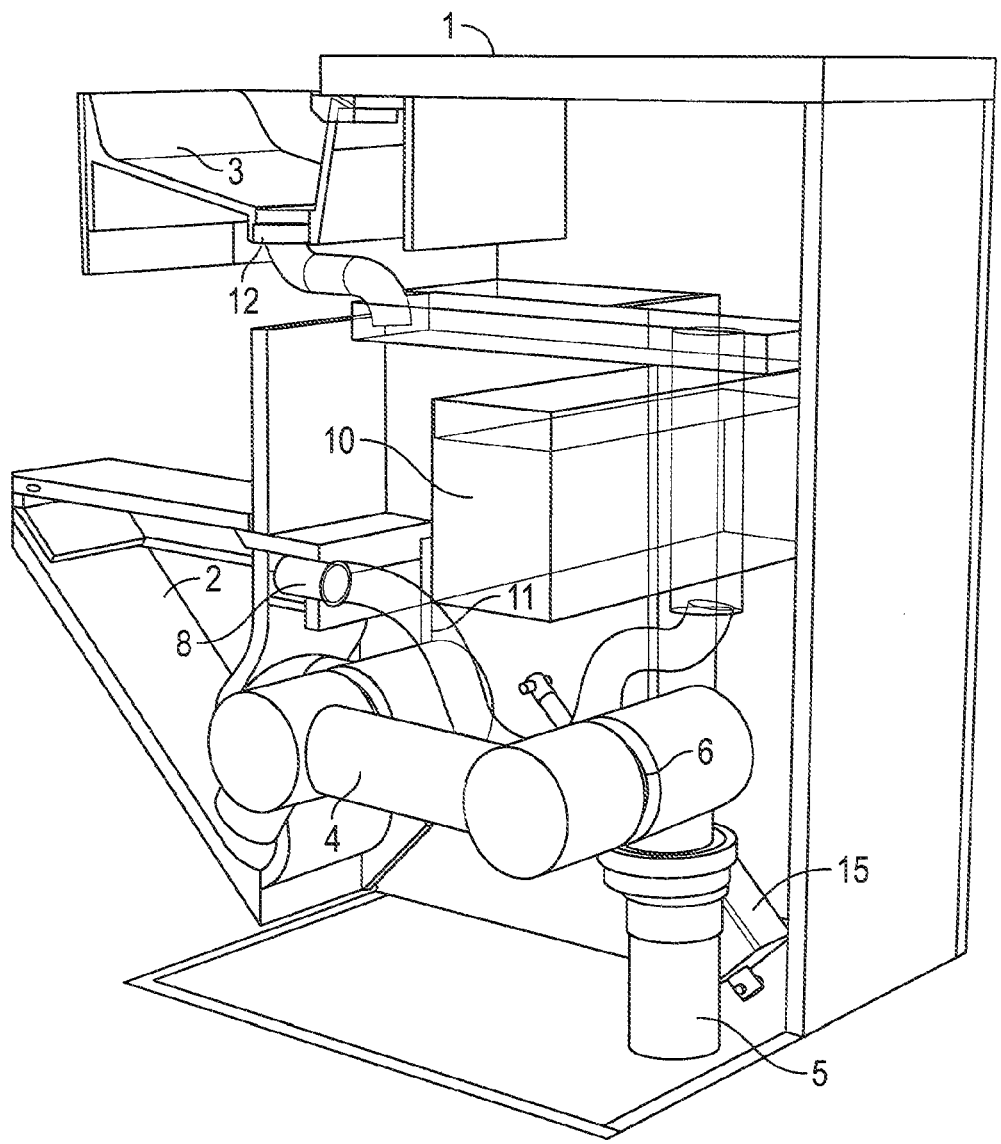
FIG. 3 is a sectional view showing of the apparatus having both the toilet bowl and basin in the open position.
Figure 4:
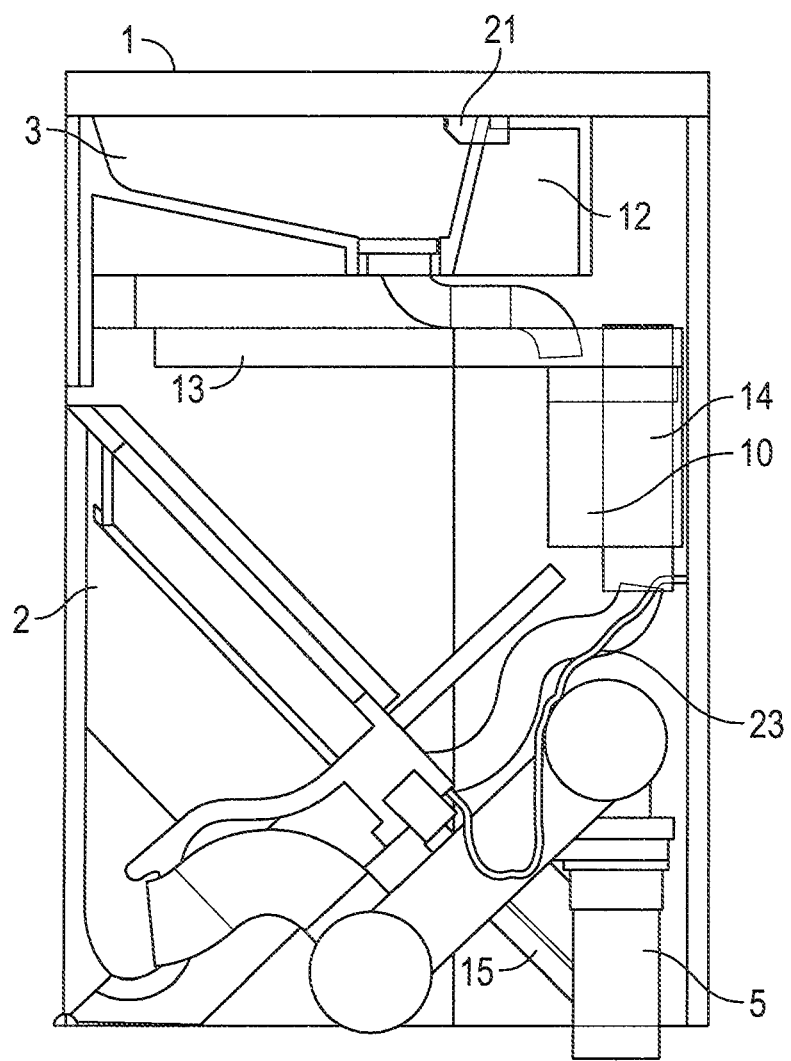
FIG. 4 is a sectional view showing of the apparatus of having both the toilet bowl and basin in the concealed position.
Figure 5:
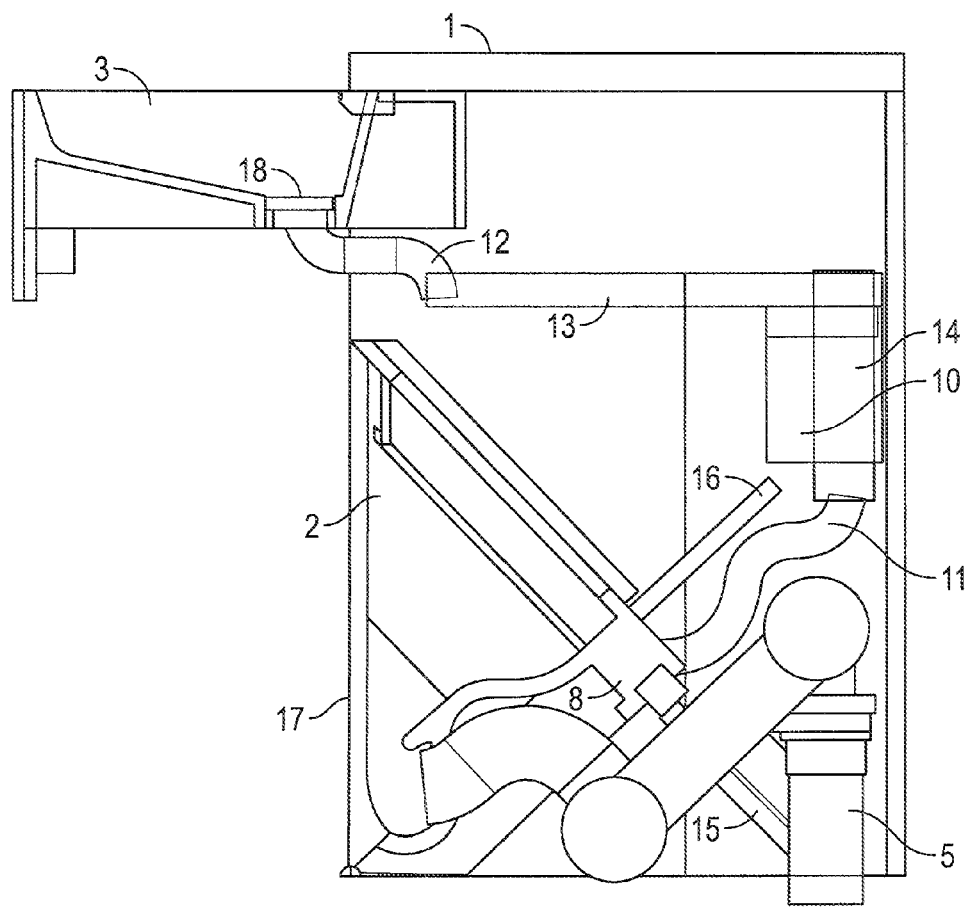
FIG. 5 is a sectional view of the apparatus having toilet bowl in the concealed position and the basin in the open position.
Figure 6:
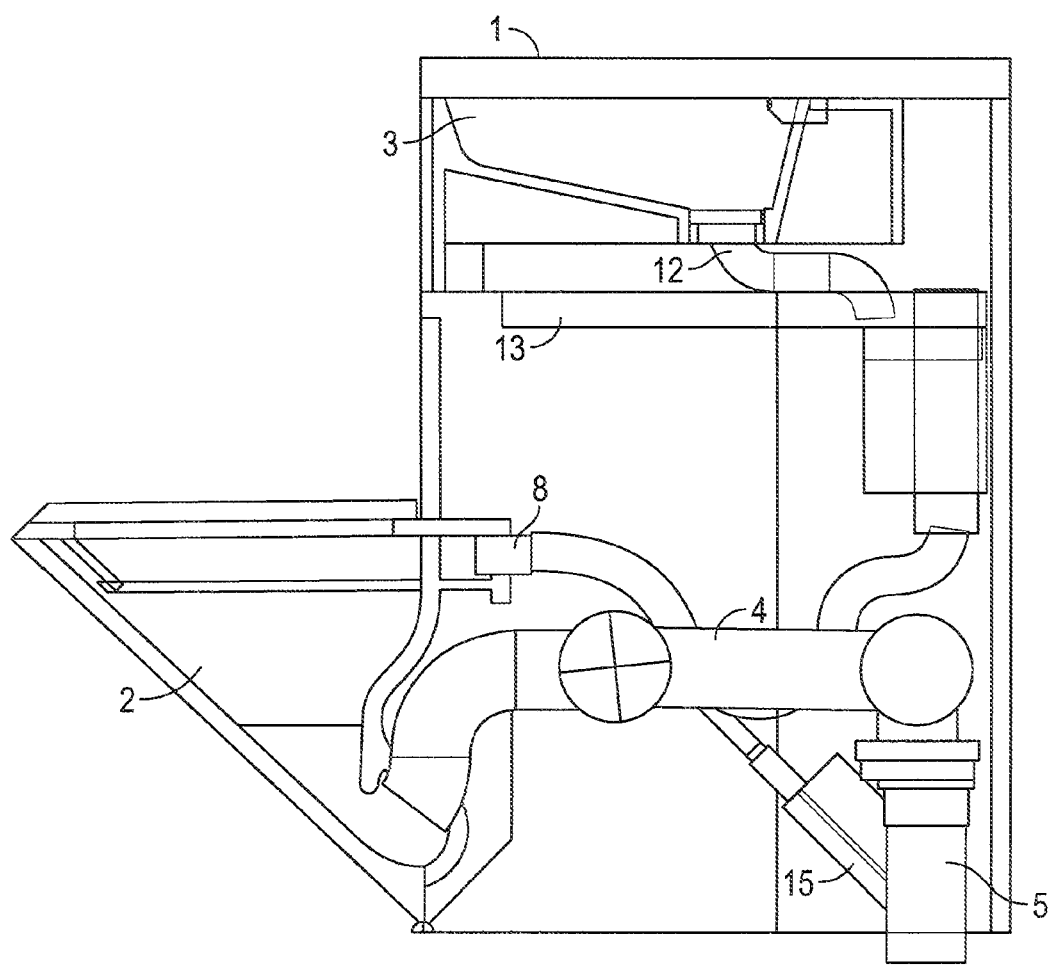
FIG. 6 is a sectional view of the apparatus having the basin in the concealed position and the toilet bowl in the open position.

FIGS. 1 to 10 show one embodiment of an apparatus according to the invention. In this example, the apparatus (1) is stand alone and in the form of a cabinet. The apparatus includes a concealable toilet bowl (2) and basin (3). The toilet bowl (2) and basin (3) are moveable between concealed positions and extended/exposed positions.

In the extended position, the toilet bowl (2) and basin (3) are accessible for use. In this particular example, both fixtures are not typically used simultaneously. However, it will be appreciated that other embodiments may have sanitary fixtures offset for simultaneous use.

Another embodiment may have the apparatus formed of separate parts or modular. For example, the basin may be contained within a first cabinet whilst the bowl may be contained in a second separate cabinet.

In the example of FIGS. 1 to 10, the toilet bowl (2) pivots on a pin hinge at the base of the cabinet. A hinged conduit (4) provides a fluid tight connection between the toilet bowl (2) and a waste outlet (5). Hinges (6, 7) allow the conduit (4) to adjust with the pivoting movement of the toilet bowl (2). Regardless of whether the toilet bowl (2) is in the concealed position or the extended position, or whether it is being moved between the two, the hinged conduit (4) adjusts accordingly such that the fluid tight connection is maintained.

The hinges (6, 7) are configured such that the conduit (4) is able to bend as required without restricting the conduits internal diameter. As the conduits internal diameter does not reduce as the conduit adjusts, the chance of sewerage or effluent becoming trapped in the conduit is minimized. In this particular example the hinged conduit is formed of an extendible connecting member (4a) pivotally connected to two end members (4b, 4c). Typically the connecting member (4a) includes cylindrical insertions configured to be received in the cylindrical sleeves of two end members (4b, 4c) (best shown in figure 11(c)). The cylindrical sleeve type engagement provides the hinge points (6, 7) in the conduit without restricting the conduits internal diameter. O rings are used to seal the engagement between end members (4b, 4c) and connecting member (4a).

Figure 11A:
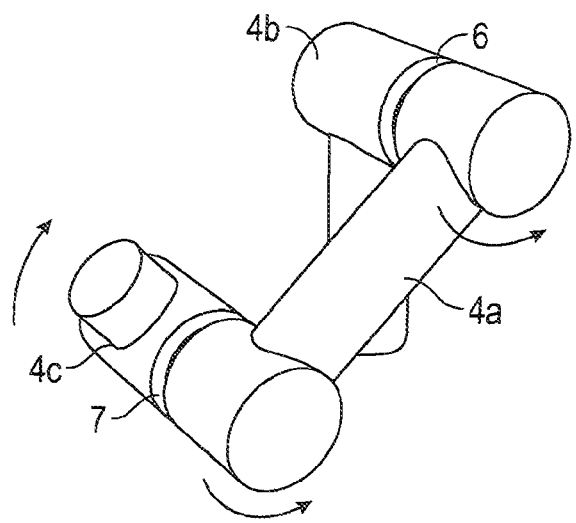
FIGS. 11(a) to (c) are perspective views of the hinged conduit used in the apparatus, in particular, (a) shows the hinged conduit positioned in the retracted configuration, (b) shows the hinged conduit positioned in the extended configuration, and (c) shows the hinged conduit partially in exploded form.
Figure 11B:
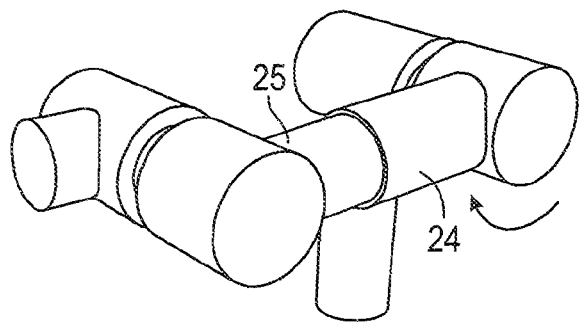
Figure 11C:
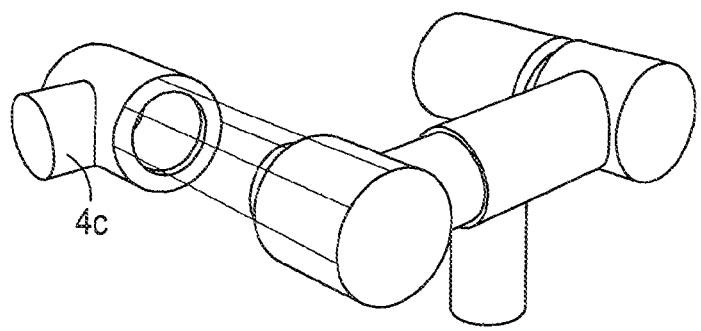

As best shown in FIGS. 11(a) to (c), the connecting member (4a) is formed of two telescopically engaged parts (24, 25) such that the connecting member (4a) is extendible.

In operation, the connecting member (4a) extends as the toilet bowl is exposed, reaching its greatest length when the toilet bowl (2) is in the fully exposed position. As the toilet bowl (2) is retracted, the connecting member (4a) retracts reaching it shortest length when the toilet bowl (2) is in the concealed position.

For maintenance or cleaning of the apparatus (1), the connecting member (4a) may be dissembled such that the bowl (2) may be removed from the apparatus. In removing the bowl (2), the flush pipe (11) is also typically disconnected.

In use, the hinged conduit (4) also operates as a plumbing trap maintaining a water seal between the bowl (2) and waste outlet (5). The trap is configured/positioned such that the apparatus maintains a water seal when the toilet bowl (2) is in either the extended or concealed position. The water seal prevents any sewer gasses or odors returning from beyond the waste outlet (5) to toilet bowl once waste has been flushed. Typically, the apparatus (1) maintains a 75mm water seal. Typically, when the toilet bowl is in the extended position, the seal is maintained at the base of the bowl: In the concealed position, the water seal typically moves to the area at first hinge point (7).

A reservoir (10) for storing flush water is also concealed within the cabinet. A piece of flexible hosing (11) provides a passage for the flush water to flow from the reservoir (10) into an upper flush inlet (8) of the toilet bowl (2). The flexible hosing (11) is such that it adjusts (bends or straightens) with pivoting of the toilet bowl (2). The reservoir may be conventional toilet cistern. Typically, the reservoir (10) is of a volume or storage capacity equal to that of a standard toilet cistern produced throughout Australia and/or the world (e.g. 6 L). However, the reservoir (10) is adapted to be received in the space immediately below the tray and satisfactorily above the toilet to allow the flush pipe (11) to adequately function. A typical reservoir used in the apparatus (1) would include all of the necessary functional components for operation of the toilet flush including a cold water inlet, a float valve, a float, an outlet suction valve, etc. The reservoir may also include an inlet to receive grey water. Grey water may be waste water from another appliance such as a dishwasher.

In an alternate form, there is no reservoir and flush water is received directly into the apparatus and toilet bowl via a flush valve connected to a mains water supply.

The basin (3), whether concealed or fully extended, has a basin drain outlet (12) that discharges the waste water into a tray (13). The tray (13) is concealed within the cabinet and is positioned beneath the basin (3). The tray (13) is elongated so that as the basin drain outlet (12) moves with extension and retraction of the basin (3), water leaving the basin drain outlet (12) is always captured by the tray (13).

Typically, the tray (13) discharges water into the reservoir (10). A single trap (water seal) is thus used for both sanitary fixtures (2, 3).

Typically, the outlet valve of the reservoir includes an integral overflow, which leads into the flush pipe. Thus when water in the reservoir exceeds a predetermined level it travels down the overflow (14) into the flush pipe.

It will be appreciated that the apparatus (1) may include an additional overflow from the reservoir directly into the waste outlet (5). Having this additional overflow Could prevent flooding in instances when the toilet is blocked.

The apparatus (1) typically includes hot water and cold water connections along with a fixed sanitary plumbing connection (5) (either via gravity or vacuum) in order to adequately maintain the function of a typical basin and toilet. In one example, flexible hosing between the water inlet connections and the basin would allow extension/retraction of the basin (3).

In addition, both the basin (3) and toilet bowl (2) may include integral overflows such that each sanitary fixture is not floodable. Being non-floodable, the apparatus may be located in any room with a sewerage waste outlet. A separate floor drain is not required. This permits the floor coverings of any room containing the apparatus (1) to be of any material desired such as, for example, ceramic tiles, marble tiles, carpet, wood paneling etc.

Movement of the toilet bowl (2) or basin (3) between the concealed and exposed positions may be manually powered or automated.

For example, as shown in FIGS. 1 to 6, an actuator (15) or hydraulic ram may be fastened at one end to the base of the cabinet and at the other end to the bowl (2) or associated part thereof. Extending the actuator pushes the toilet bowl (2) outward from the cabinet into the extended position. When automated, the apparatus may be operated through pushing buttons that, in turn, extend a drawer which contains the basin (3) and/or actuate the actuator to expose the toilet bowl (2) and its seat. Extension and retraction of the basin (3) and toilet bowl (2) may also be actuated remotely using a remote control.

For manual lowering/raising of the bowl (2), a lever may be provided on the exterior of the cabinet which is operatively coupled to the actuator or an extendable arm such that operating the lever moves the toilet bowl between the extended and concealed positions.

Alternatively the bowl (2) may be lowered or raised in a motion similar to that used in the raising/lowering of a conventional toilet seats (i.e. pulled outward from the cabinet by a handle and lifted up into the cabinet). It will be appreciated that the basin may also be extended/retracted manually via a handle or otherwise.

Typically, at least one stop is positioned within the cabinet to abut the toilet bowl (2) (or associated part thereof) as it is returned to the concealed position. The stop(s) prevent over retraction of toilet bowl and thereby acts to minimize the stress placed on the actuator (15). Similarly a stop may abut the toilet bowl (or associated part thereof) as it reaches full extension so as to prevent over extension of the toilet bowl (2).

Figure 21A:
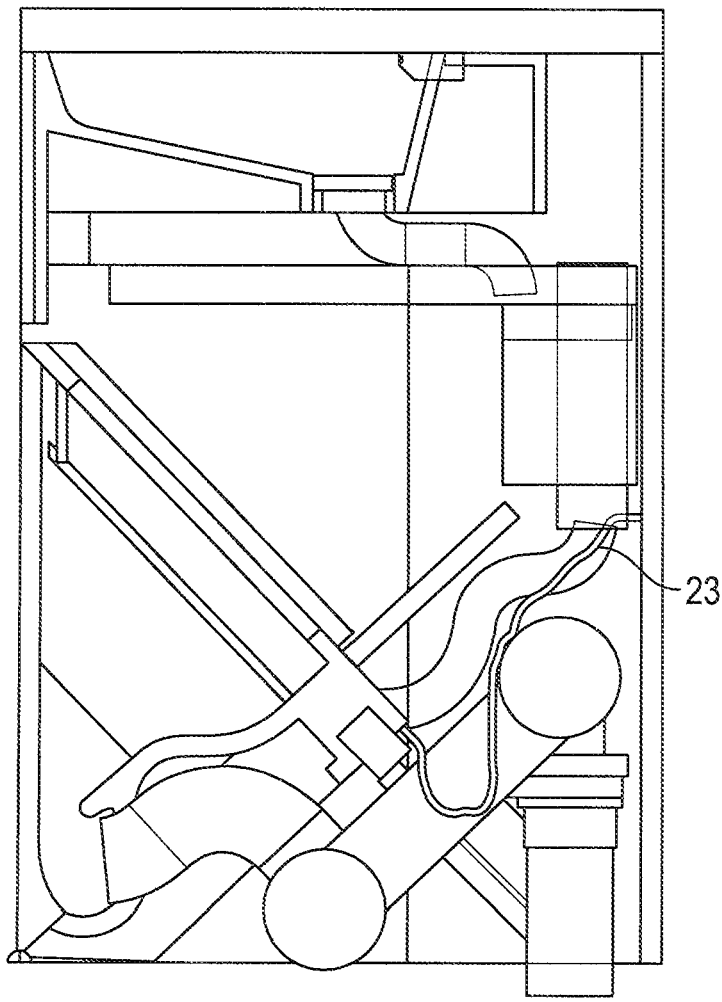
FIG. 21 shows and example of a sanitary apparatus including an additional stop strap/belt, in particular, (a) shows the toilet bowl in the closed position, and (b) shows the toilet bowl in the open position.
Figure 21B:
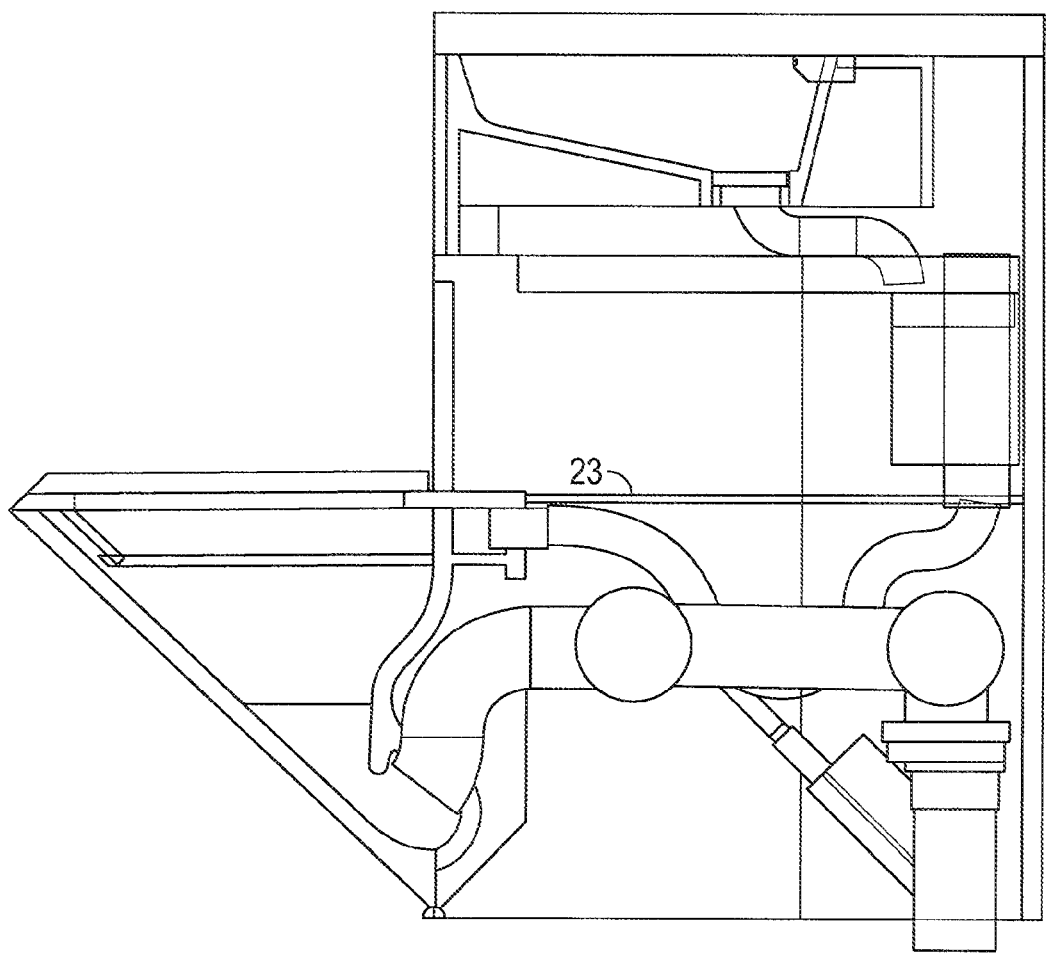

Alternative stopping/support means for the toilet bowl may also be provided in the form of a belt or strap (23) fastened to the rear wall of the apparatus (see FIGS. 21a and 21b). When the bowl is extended the strap reaches full extension and thus provides an additional means to prohibit the bowl over extending. An additional belt/strap may also be looped around the hinged conduit (4) to provide additional support to the hinged conduit.

Figure 7:
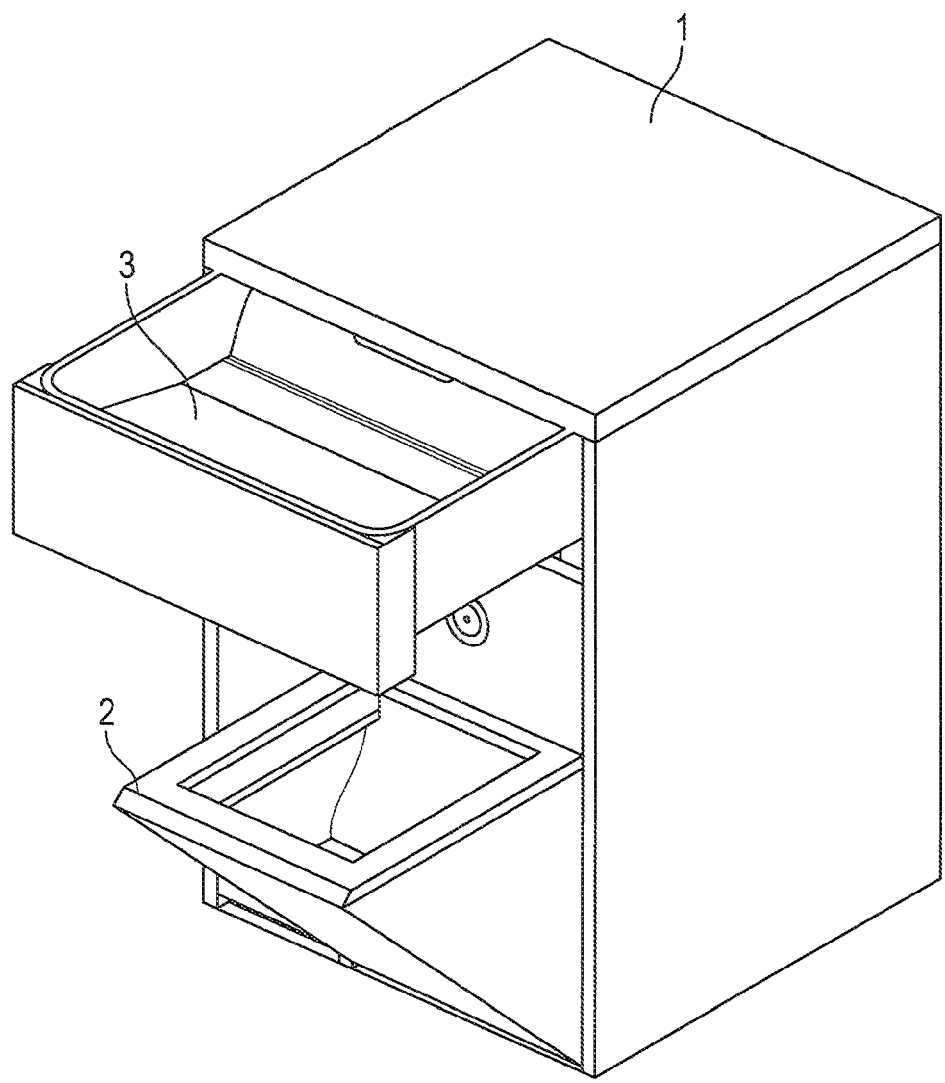
FIG. 7 is a perspective view of the apparatus having both the toilet bowl and basin in the extended position.
Figure 8:
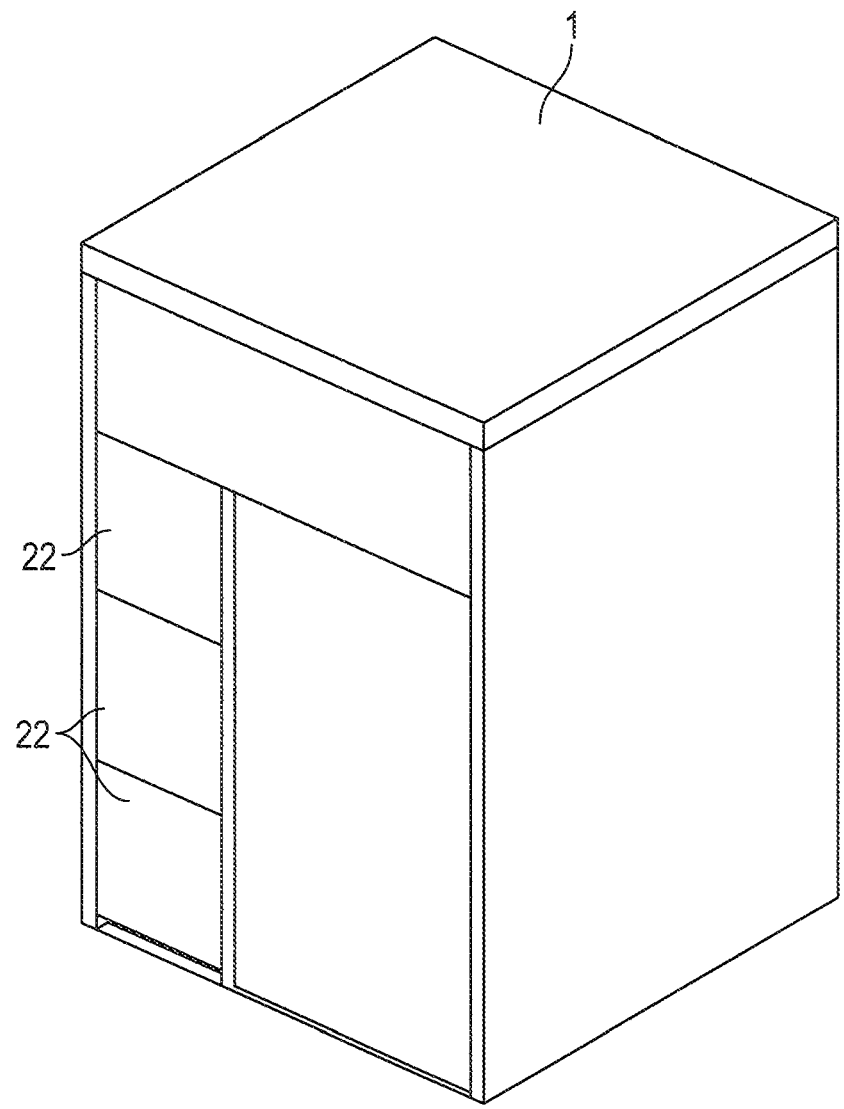
FIG. 8 is a perspective view of the apparatus having both the toilet bowl and basin in the concealed position.
Figure 9:
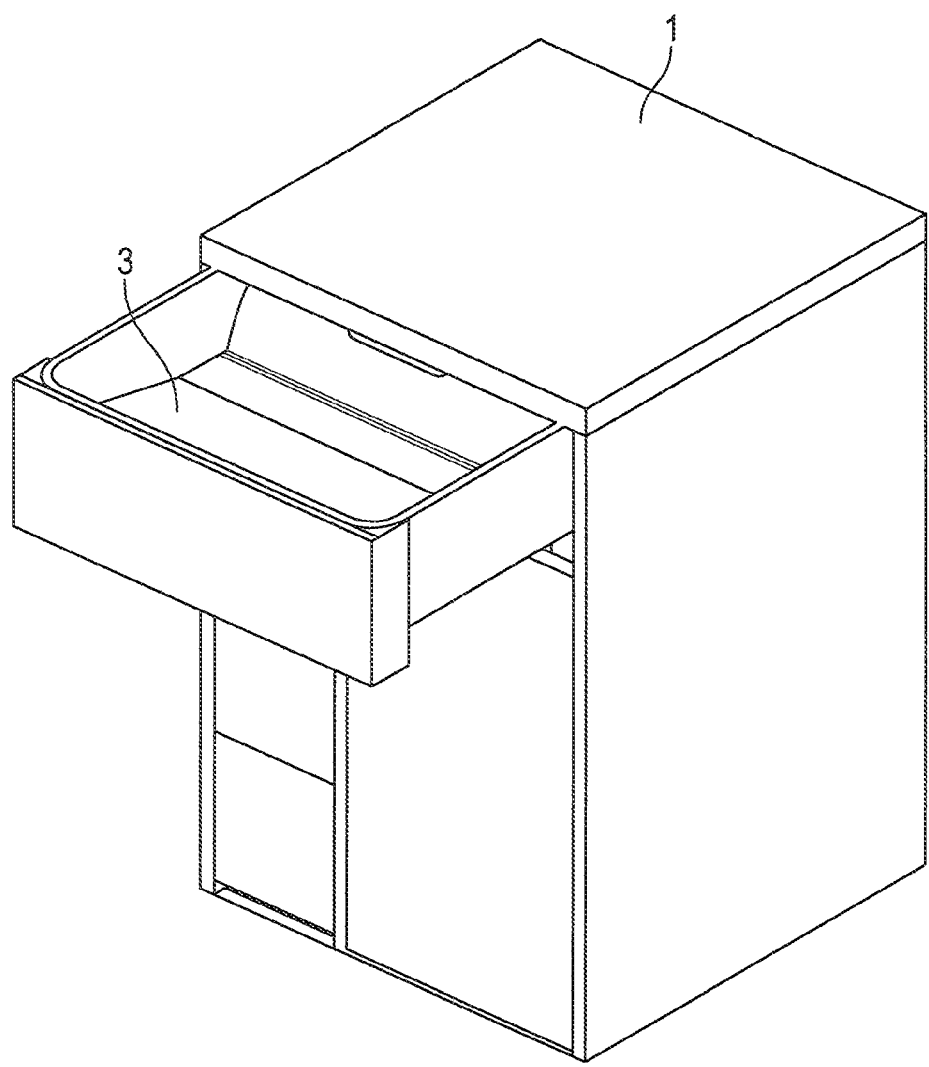
FIG. 9 is a perspective view of the apparatus having the basin in the extended position.
Figure 10:
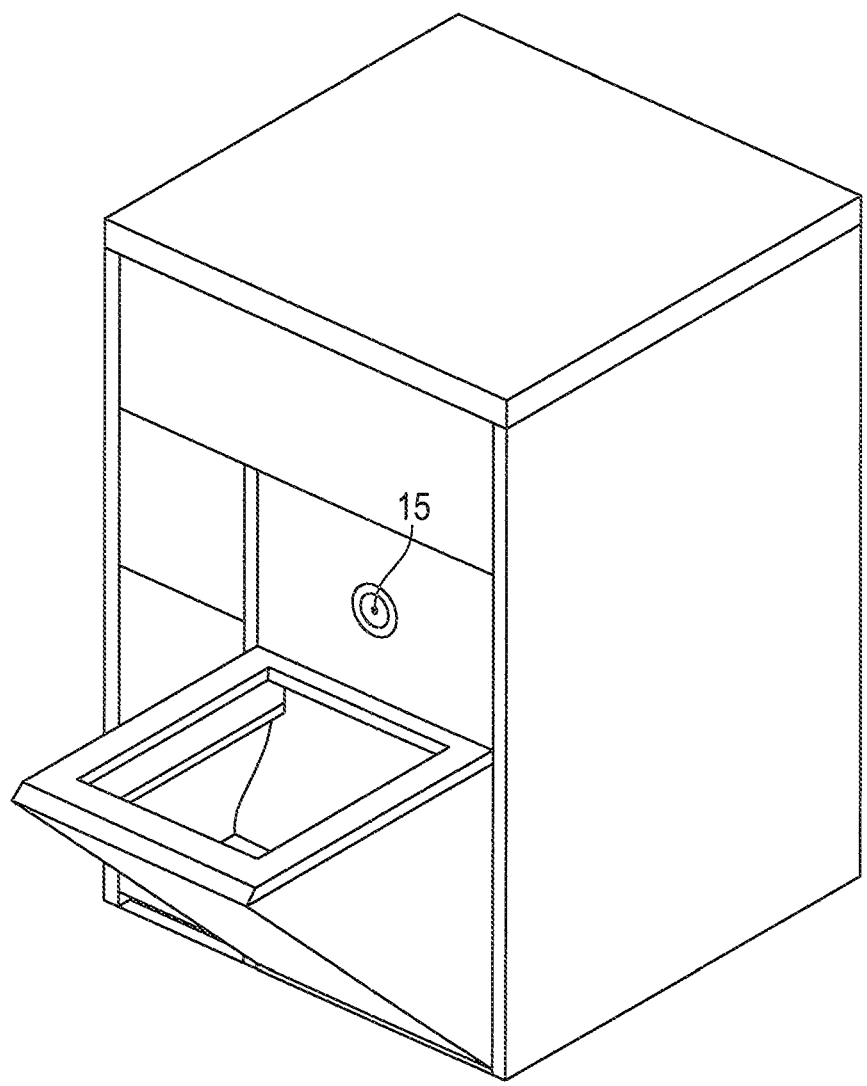
FIG. 10 is a perspective view of the apparatus having both the toilet bowl in the extended position.

Flush buttons (50) are typically positioned on a panel (16) above the toilet bowl (see FIG. 7 or 10 for example). The flush button panel retracts with the toilet bowl (2) such that the buttons are not visible to a user when the toilet bowl (2) is in the concealed position. In the concealed position, it is the underside (17) of the toilet bowl fixture which forms the front face of the cabinet. Pivoting the toilet bowl (2) out of the cabinet exposes the bowl and button panel (16) which is shaped to fit flush with the front face of the cabinet. It will be appreciated that the flush buttons may be positioned elsewhere also.

The flush buttons are operatively coupled to the flush mechanism of the reservoir (10). Typically the coupling is via a pneumatic hose that can bend or adjust with movement of the flush button panel between exposed and concealed positions. The apparatus may have both half and full flush capability.

For safety the apparatus may be configured to operate on 24 Volts. The apparatus may include an appropriate transformer to convert mains power (eg; 240V) to 24V.

It will be appreciated that the apparatus may form part of any piece of furniture, may be a free standing appliance, or may be seamlessly integrated into a wall or other structure.

In addition to providing concealed sanitary fixtures, the apparatus (1) may also provide storage space through drawers (22). For example, one of the drawers may be configured to receive a toilet brush whilst another of the drawers may include a roller to hold and dispense toilet paper. There may also be a drawer for additional rolls of toilet paper to be stored.

The cabinet (1) may be built from any type of material such as, for example, wood paneling, stainless steel, ceramics and/or marble.

In some embodiments the basin (3) may include a waterfall spout, operable by a hands free sensor control. The temperature of the basin water may also be finely controlled via the use of a temperature mixing device. For example, temperature control of the basin may be activated by a push button thermostat activating 1° c up or 1° c down in by a simple touch.

The basin may also include a removable tray (18) positioned above the basin drain outlet (12). The tray is adapted to fit the base of the basin (3) whilst leaving a narrow elongate passage (20) for waste water to travel to the basin drain outlet (12). The tray thus hides the drain outlet and any debris caught therein from the user. The basin may also include a removable plug to block the drain (12).

A concealed light (21) may be included above the basin and beneath the roof of the cabinet to light the basin when extended. The light may be configured to operate automatically on extension and automatically power off on retraction of the basin.

The apparatus (1) may also include access panels such that internal components can be easily accessed for repair/maintenance.

Figure 12A:
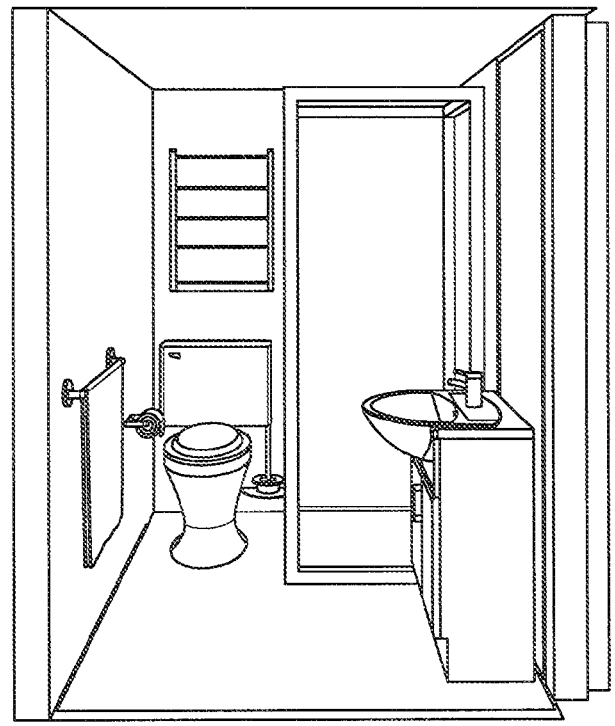
FIG. 12a shows a conventional bathroom space.

The sanitary apparatus can be used to improve space efficiency and bathroom aesthetics. For example a conventional bathroom arrangement is shown in FIG. 12*a*, wherein all sanitary fixtures are fixed to the wall and floor in tight configurations. The space is cluttered, and unusable for other activities.

Figure 12B:
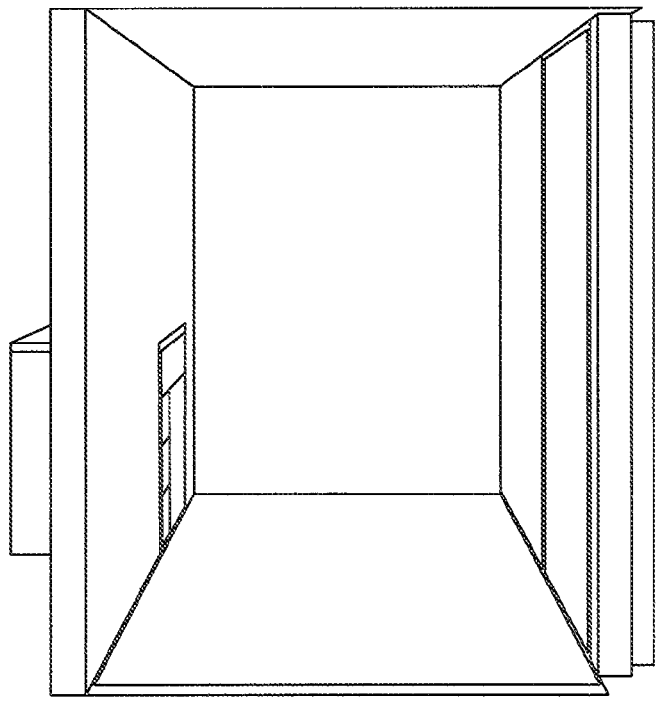
FIG. 12b shows an example of a bathroom space that incorporates the sanitary apparatus.
Figure 13A:
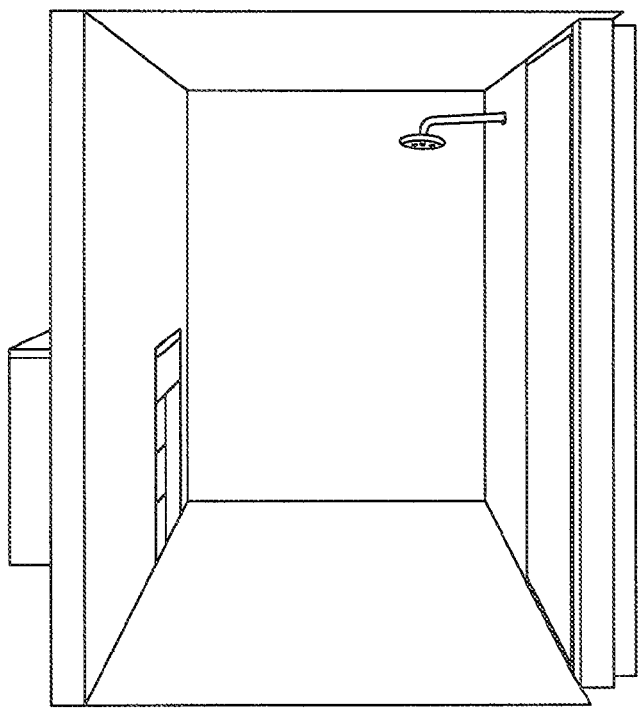
FIG. 13(a) to (d) show views of an example of bathroom space that implements the sanitary apparatus, in particular, (a) shows a front perspective view with toilet bowl and basin concealed, (b) shows a front perspective view with basin exposed, (c) shows a front perspective view with toilet bowl exposed and (d) shows a top perspective view with toilet bowl exposed.
Figure 13B:
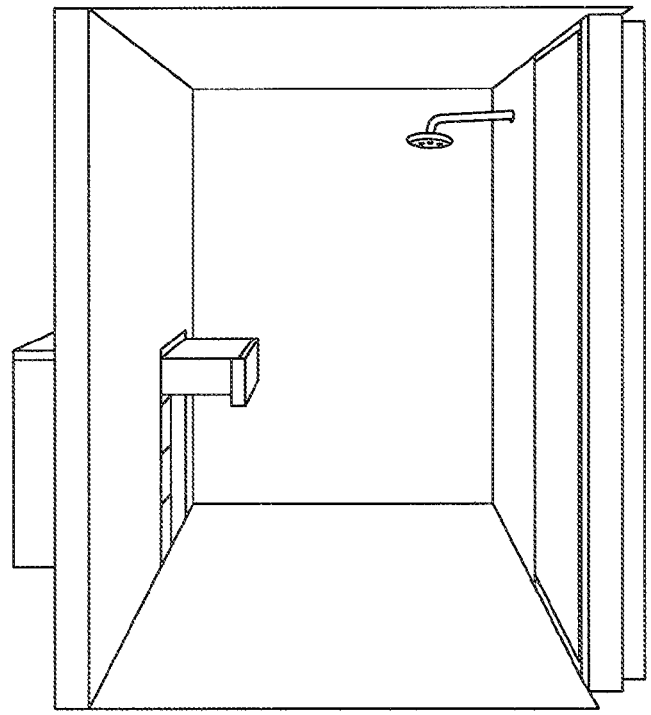
Figure 13C:
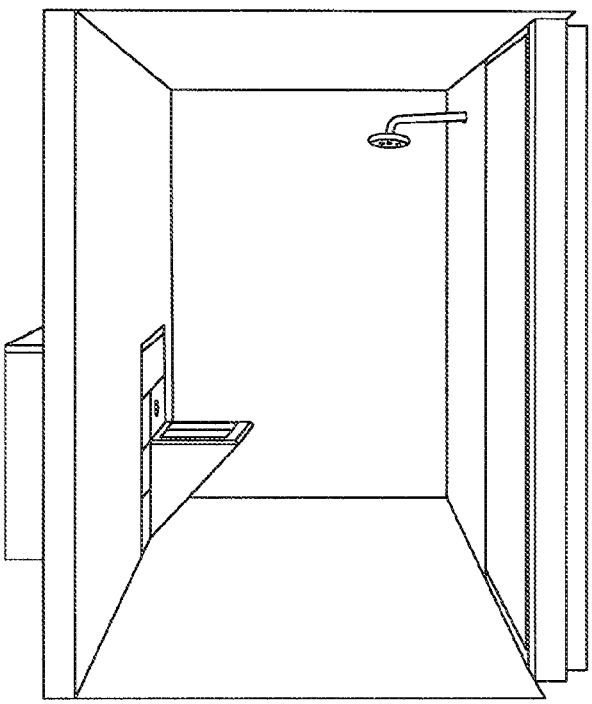
Figure 13D:
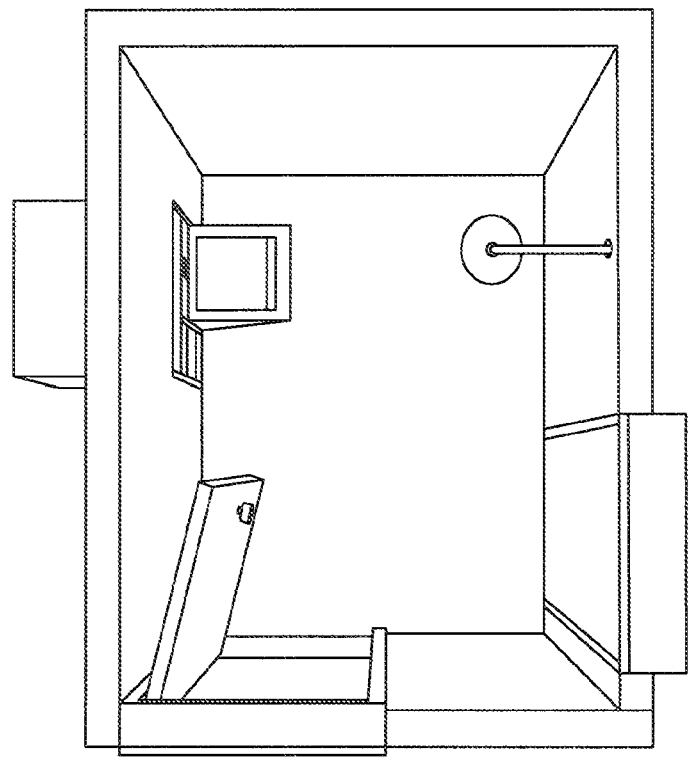
Figure 15A:
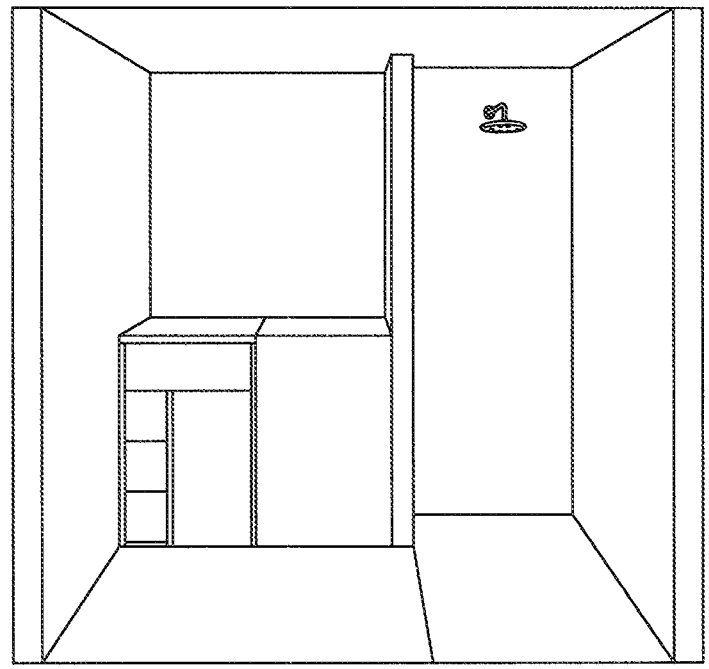
FIGS. 15(a) to (d) show views of an example bathroom, particularly suited to hotels, that implements the sanitary apparatus, in particular, (a) shows a front perspective view with toilet bowl and basin concealed, (b) shows a front perspective view with basin exposed, (c) shows a front perspective view with toilet bowl exposed and (d) shows a top perspective view with toilet bowl exposed.
Figure 15B:
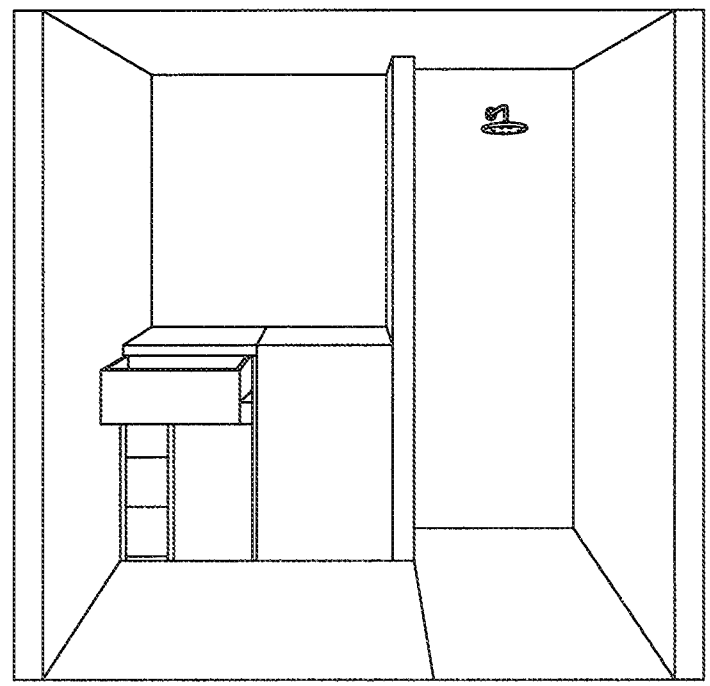
Figure 15C:
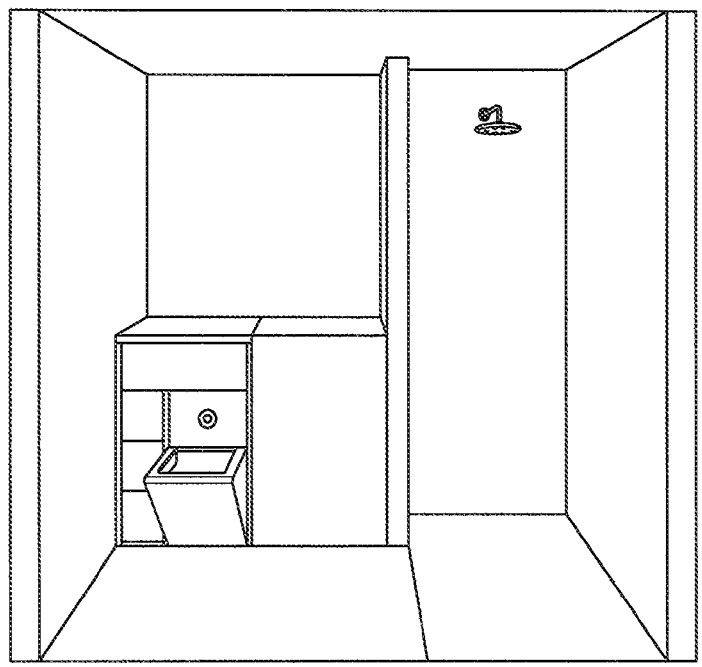
Figure 15D:
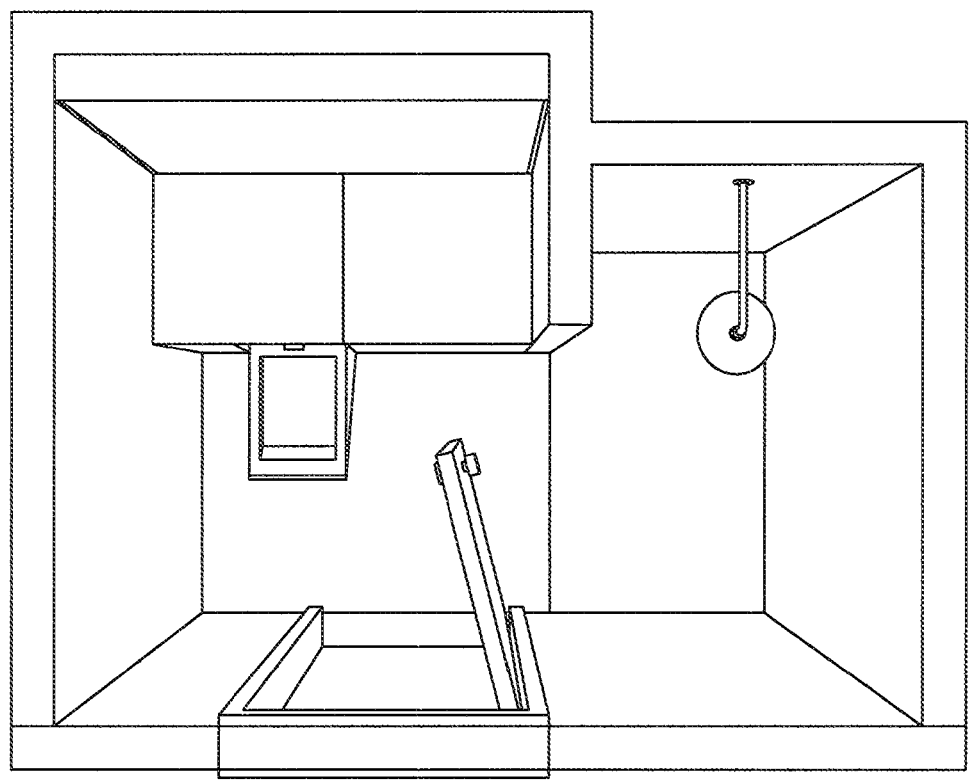
Figure 16A:
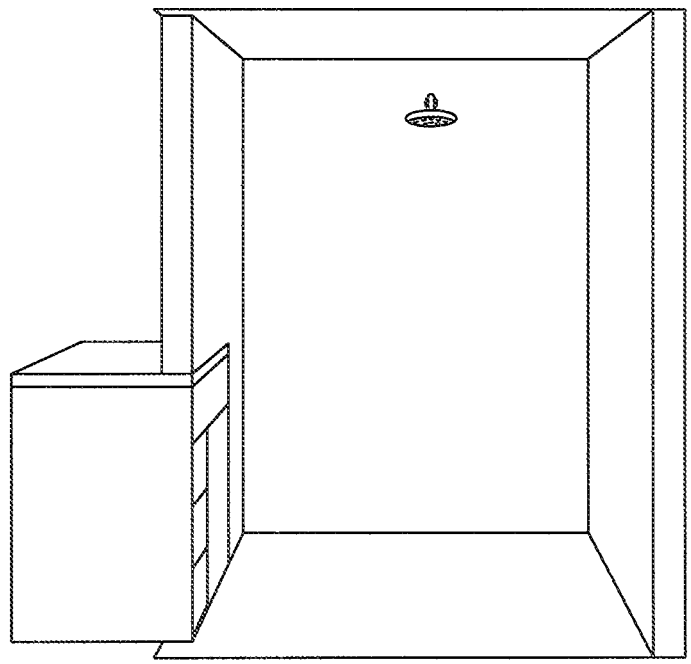
FIGS. 16(a) to (d) show views of an example en-suite or studio bathroom that implements the sanitary apparatus, in particular, (a) shows a front perspective view with toilet bowl and basin concealed, (b) shows a front perspective view with basin exposed, (c) shows a front perspective view with toilet bowl exposed and (d) shows a top perspective view with toilet bowl exposed.
Figure 16B:
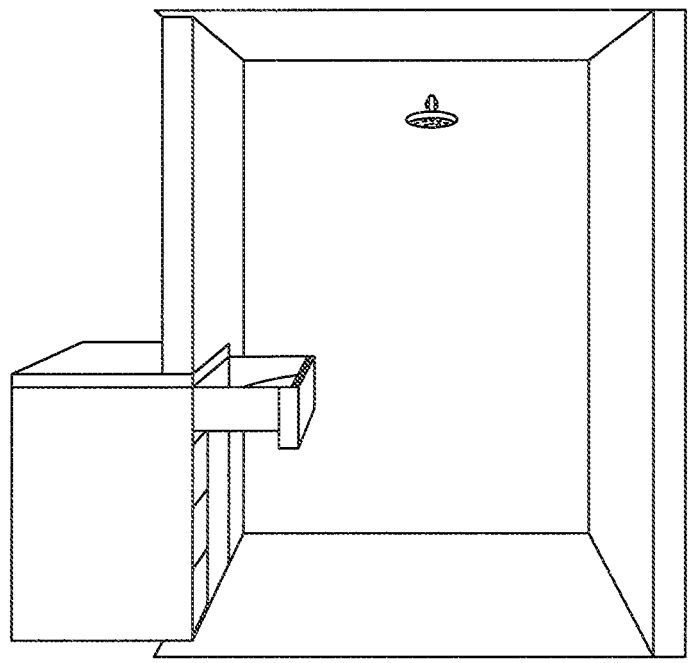
Figure 16C:
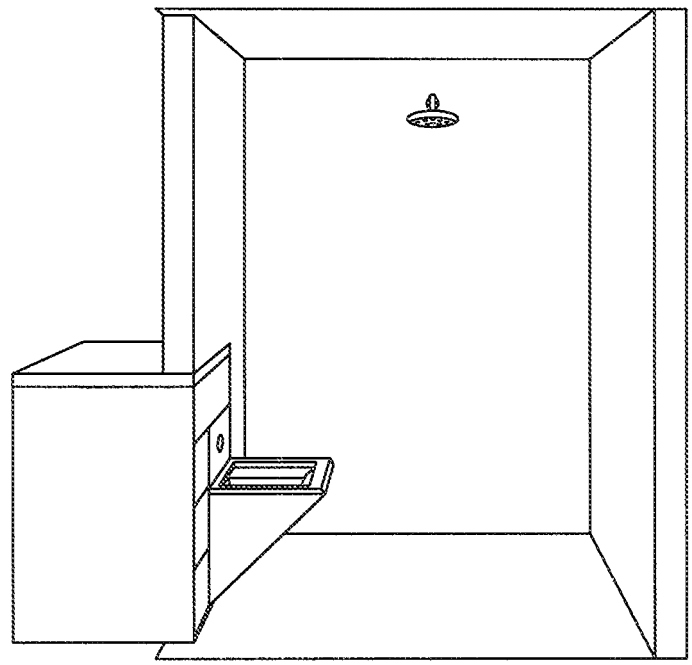
Figure 16D:
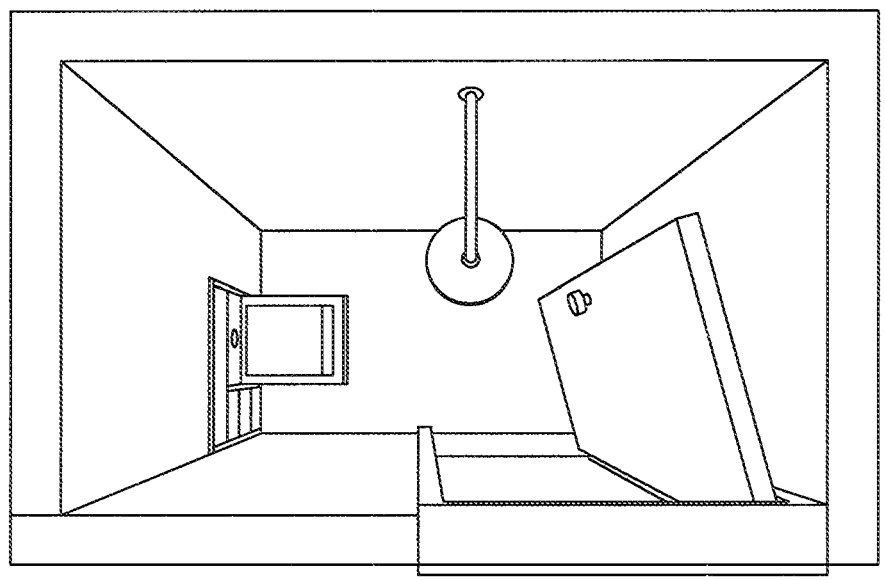
Figures 17A, 17B, 17C:
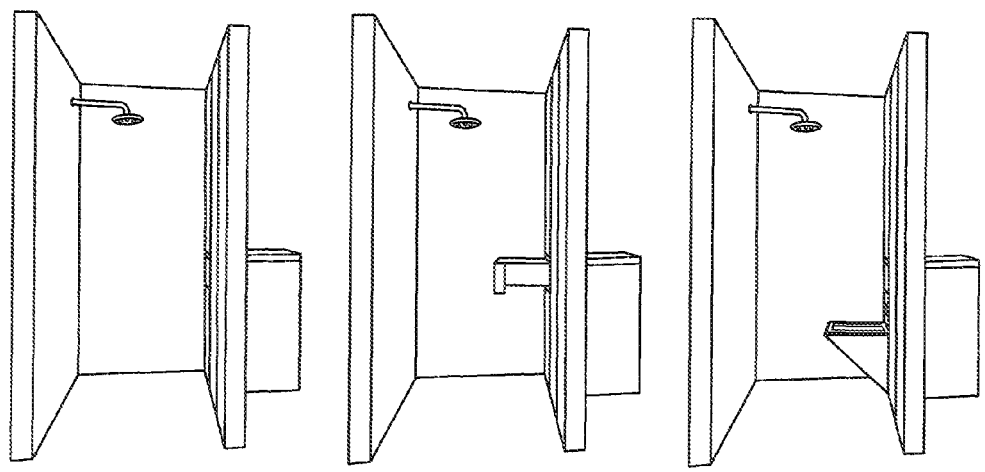
FIGS. 17(a) to (d) show views of an example of a shower/toilet cabin implementing the sanitary apparatus of FIG. 1, and particularly suited for use on boats, trains or aircraft, in particular, (a) shows a front perspective view with toilet bowl and basin concealed, (b) shows a front perspective view with basin exposed, (c) shows a front perspective view with toilet bowl exposed and (d) shows a top perspective view with toilet bowl exposed.
Figure 17D:
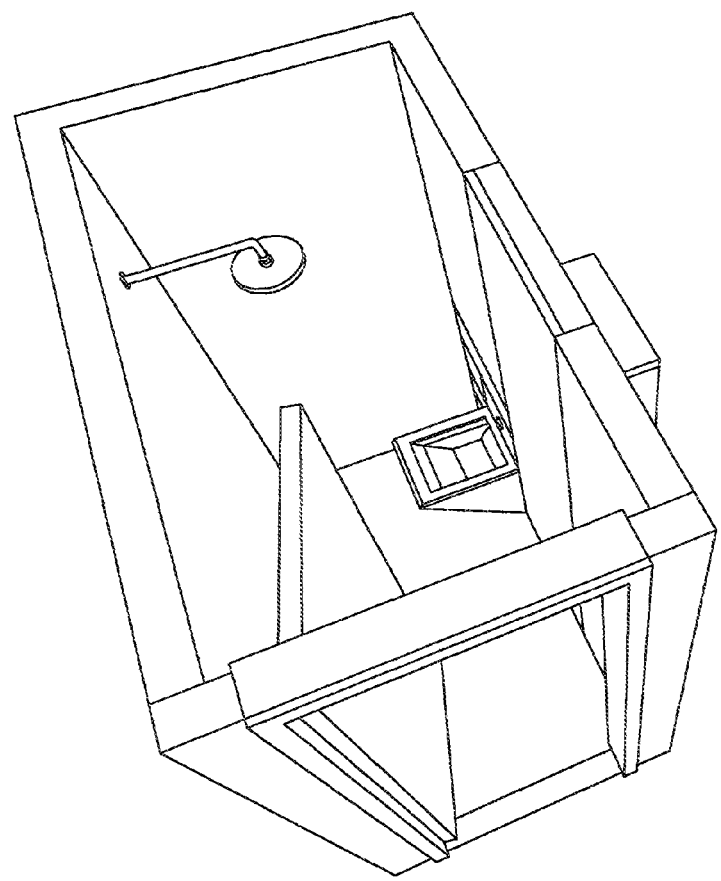
Figure 18A:
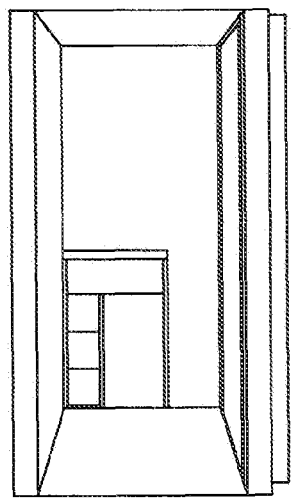
FIGS. 18(a) to (d) show views of an example of a bathroom space, particularly suited to cabins for boats, trains or aircraft, implementing the sanitary apparatus, in particular, (a) shows a front, perspective view with toilet bowl and basin concealed, (b) shows a front perspective view with basin exposed, (c) shows a front perspective view with toilet bowl exposed and (d) shows a top perspective view with toilet bowl exposed.
Figure 18B:
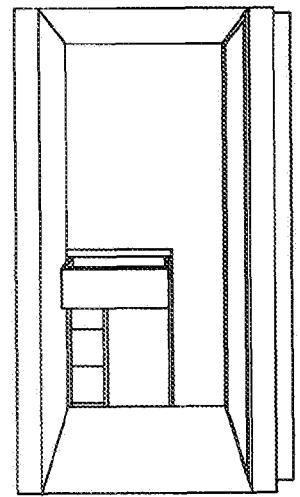
Figure 18C:
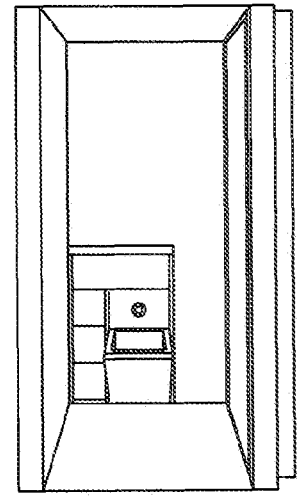
Figure 18D:
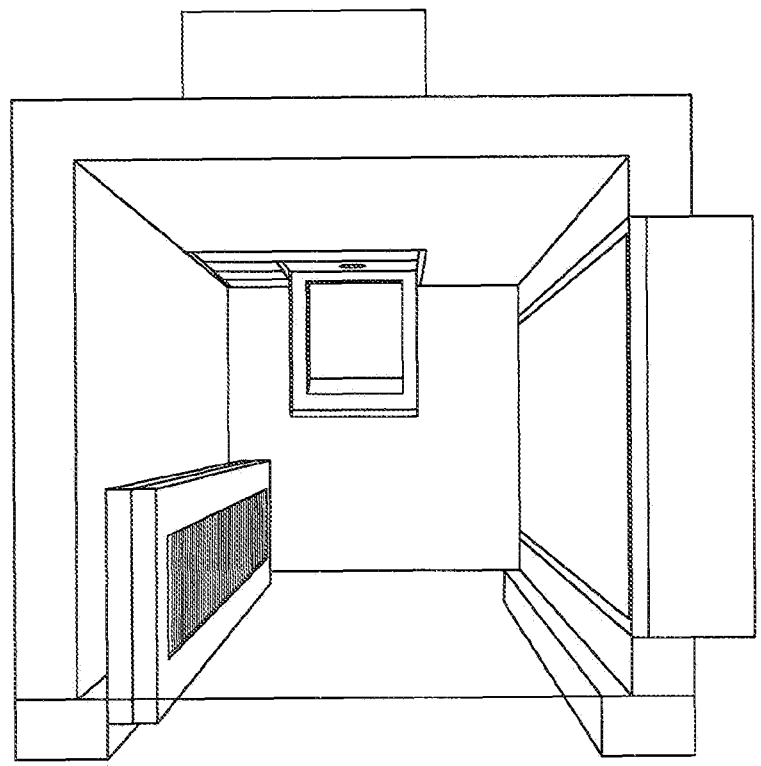
Figure 19A:
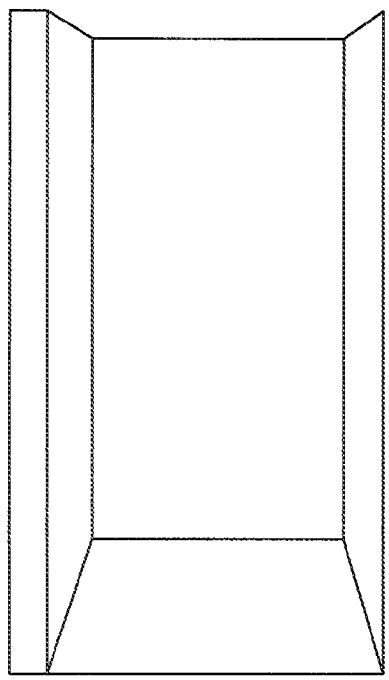
Figure 19B:
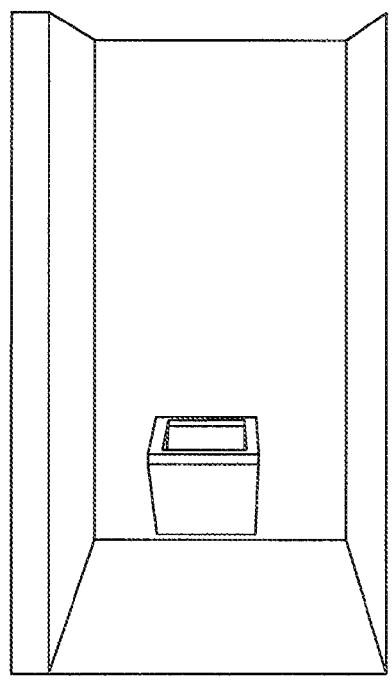
Figure 19C:
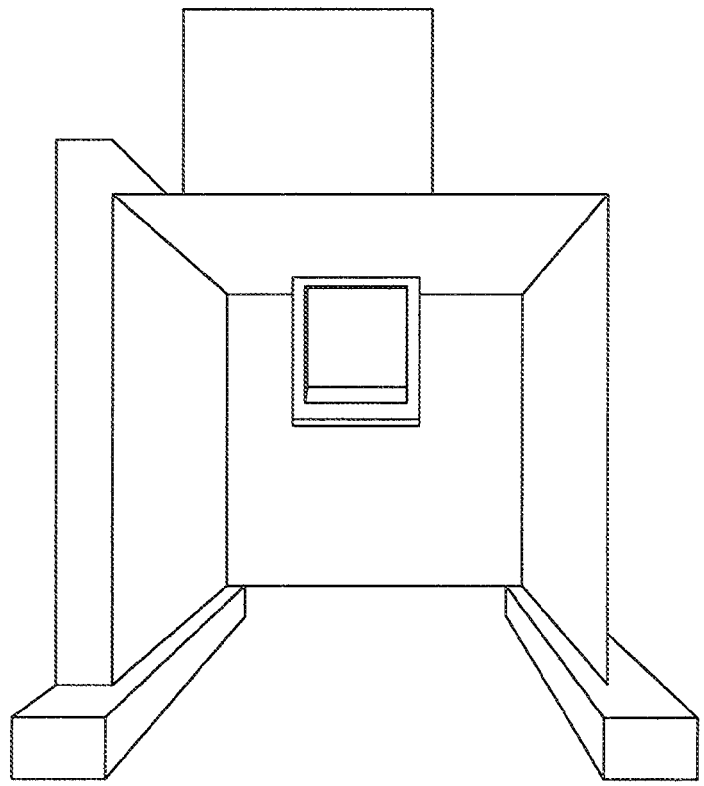
Figure 20A:
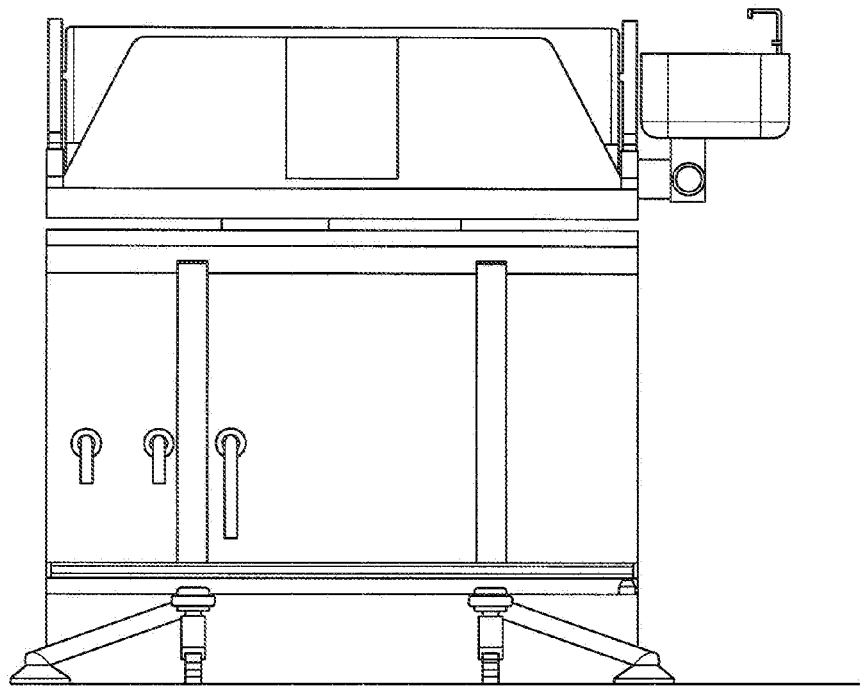
FIGS. 20(a) to (f) show views of a hospital bed incorporating an example of the sanitary apparatus, in particular (a) shows a front view with basin and toilet bowl concealed, (b) shows a perspective view with basin and toilet bowl concealed, (c) shows a front view with toilet bowl exposed, (d) shows a perspective view with toilet bowl exposed, (e) shows a top view with toilet bowl exposed, and (f) shows a top view with toilet bowl and basin concealed.
Figure 20B:
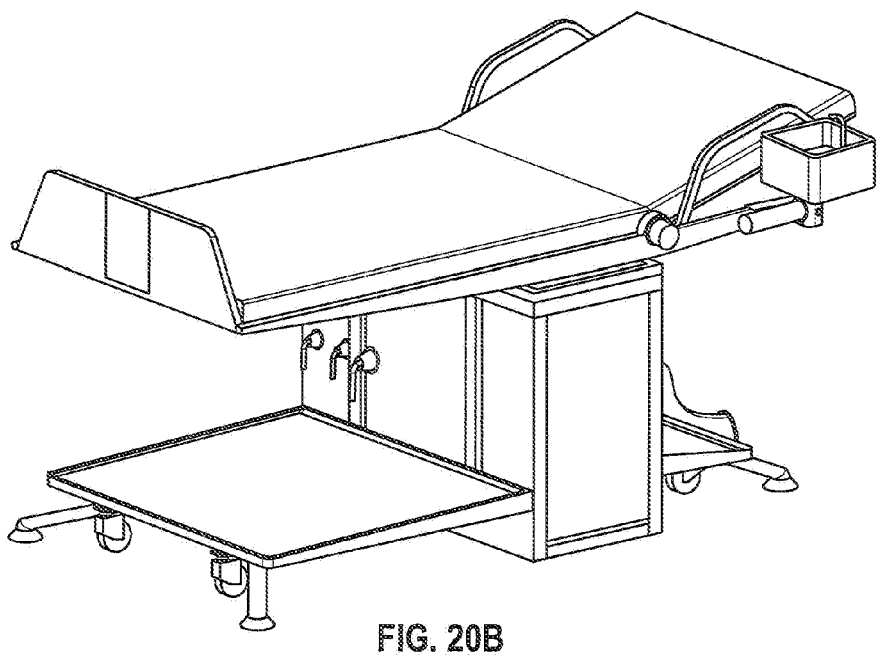
Figure 20C:
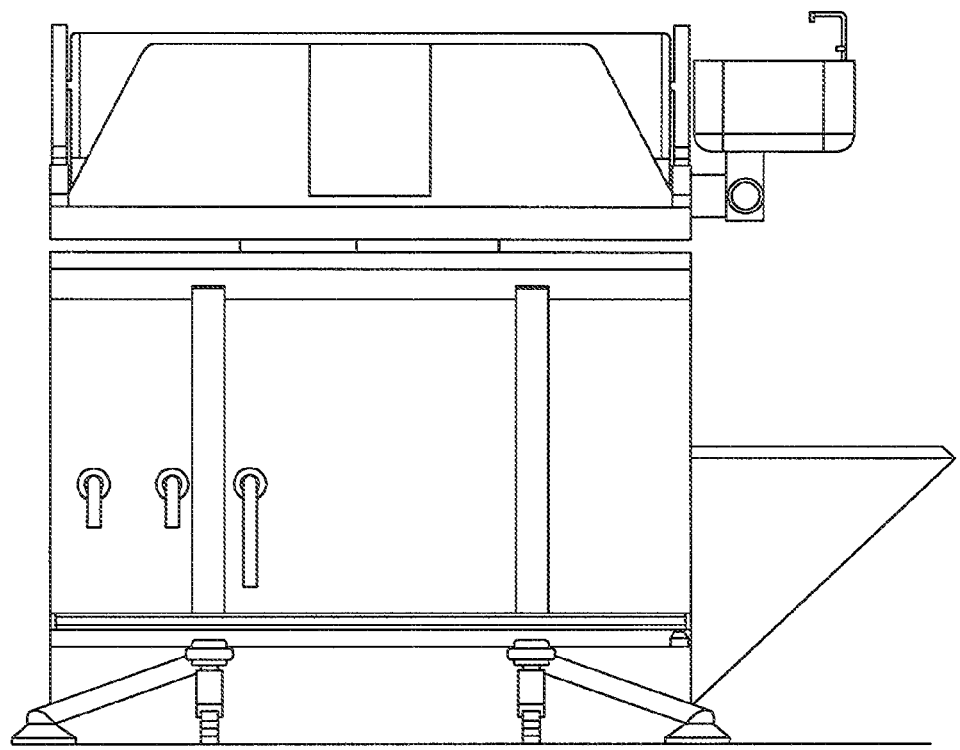
Figure 20D:
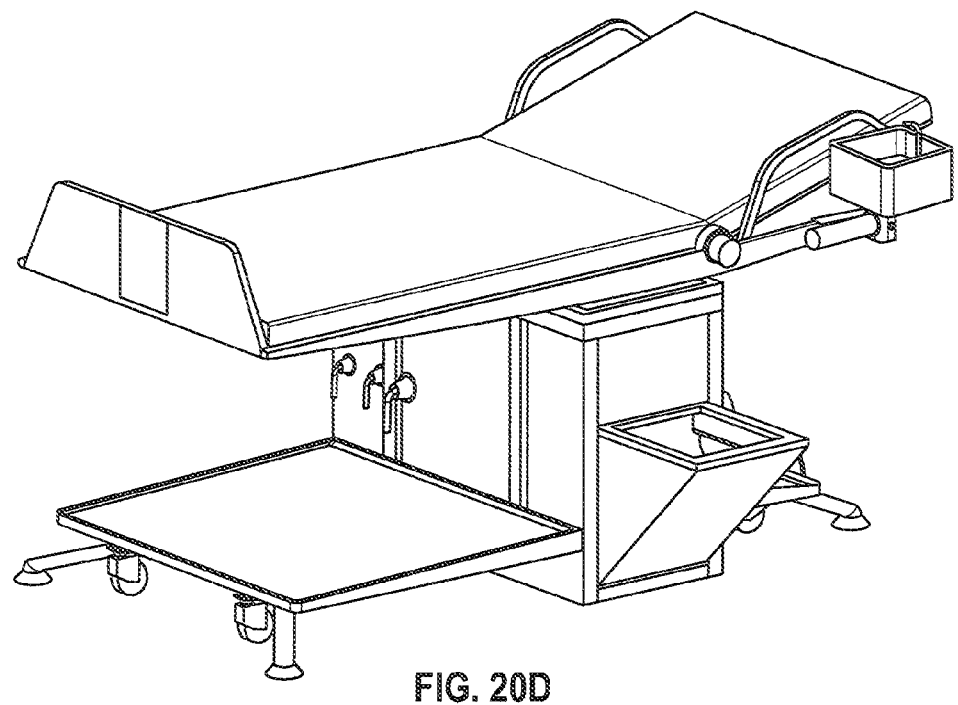
Figure 20E:
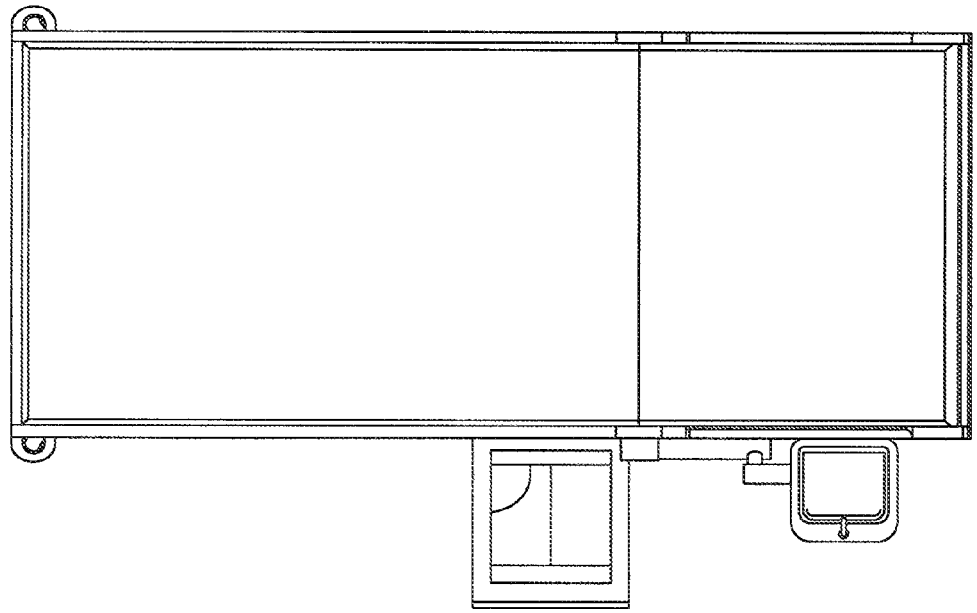
Figure 20F:
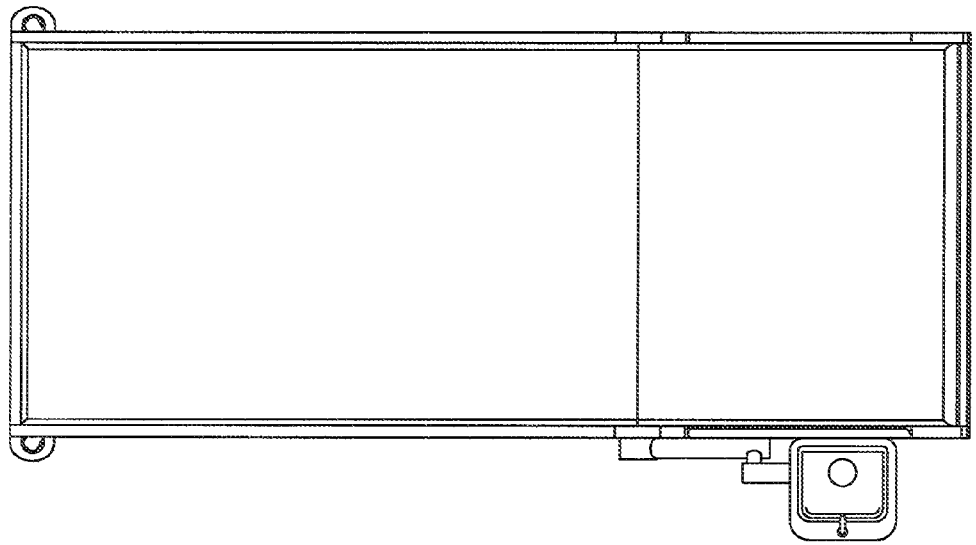

In contrast, the bathroom space as shown in FIG. 12*b*, which incorporates the sanitary apparatus as described herein, provides maximum availability of floor space. Using the apparatus, a room may contain all the same fixtures and storage space as conventional bathroom, but the fixtures may be concealed such that the room may be used for other activities. In the concealed state there is no clutter, visible fixtures or accessories, which provides the opportunity to use the space for purposes other than just a dedicated bathroom. For example, the space may be used for exercise, yoga or meditation.

The sanitary appliance allows for bathrooms much smaller than previously thought possible. Thus, by using the sanitary apparatus, floor space which previously had to be assigned to the bathroom may be allocated to other rooms or living areas of a house.

It will be appreciated that the sanitary apparatus as described herein may have wide ranging applications beyond that of a typical home bathroom setting. Such potential applications are shown in FIGS. 13 to 20. These applications include, but are not limited to, bathrooms (see for example FIGS. 13*a-d*), powder rooms (see for example FIGS. 14*a-d*), hotel bathrooms (see for example FIG. 15), en-suites or studio bathrooms (see for example FIG. 16), bathrooms for boat, train or aircraft cabins where space is limited (see for example FIG. 17 or 18), and/or toilet cubicles (see for example FIG. 19).

One particular application of the apparatus is for incorporation into a hospital bed (see for example FIG. 20). In addition to saving space within a hospital, the apparatus may serve to minimise the instance of patient injury as travelling to and from the bathroom is not required. Additionally, hospital staff would not have to provide as much physical assistance to patients who need to go to the bathroom, freeing up their time for other tasks.

It will be appreciated that many modifications will be apparent to those skilled in the art without departing from the scope of the present invention.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A sanitary apparatus for connection with a plumbing infrastructure of a building or other structure, the apparatus including:
   a housing;
   a concealable toilet bowl movable between a concealed position within the housing and an exposed position external to the housing;
   a waste outlet;
   a hinged conduit providing at least part of a fluid tight connection between the toilet bowl and the waste outlet, the hinged conduit permitting the toilet bowl to be moved between the concealed position and the exposed position whilst maintaining the fluid tight connection wherein the hinged conduit includes:
      an inlet part in fluid tight connection with the toilet bowl at one end thereof and including a cylindrical sleeve type connection portion at the other end thereof;
      an outlet part in fluid tight connection with the waste outlet at one end thereof and including a cylindrical sleeve type connection portion at the other end thereof; and
      a telescopically extendable connecting part including cylindrical sleeve type connection portions at each end thereof configured to be rotatably engaged with the respective cylindrical sleeve type connection portions of the inlet and outlet parts,
      the hinged conduit thereby having a first hinge between the inlet part and the connecting part and a second hinge between the outlet part and the connecting part, the hinges having cylindrical sleeve type engagement such that the internal diameter of the conduit at the hinges is maintained during movement of the toilet bowl between the concealed position and the exposed position,
   wherein, in the concealed position, the first hinge is lower vertically than the second hinge such that in use, the sanitary apparatus provides a water seal between the toilet bowl and the waste outlet at the first hinge.

2. An apparatus as claimed in claim 1, wherein the outlet part of the hinged conduit is fixed within the sanitary apparatus and the inlet part of the conduit moves with respect to the outlet part as the toilet bowl is moved between the concealed position and the exposed position.

3. The sanitary apparatus as claimed in claim 1, wherein, in the extended positon, the first and second hinges of the hinged conduit are substantially vertically level and in use, a water seal is provided at the base of the toilet bowl.

4. A bed including an apparatus as claimed in claim 1.

5. A cabinet including an apparatus as claimed in claim 1.

6. A prefabricated cabin for use in an aircraft, boat, train or the like, the cabin including an apparatus as claimed in claim 1.

7. A sanitary apparatus as claimed in claim 1, wherein the telescopically extendable connecting art of the hinged conduit extends along an extension axis, and the cylindrical sleeve type connection portions at each end of the connecting part open in the same outward radial direction with respect to the extension axis.

8. A sanitary apparatus as claimed in claim 7, wherein the pivot axis of the first and second hinges is substantially perpendicular to the extension axis the connecting part.

* * * * *